United States Patent
Bartlett et al.

(10) Patent No.: US 11,681,077 B2
(45) Date of Patent: Jun. 20, 2023

(54) OPTICAL METASURFACE WITH SUB-HOGELS

(71) Applicant: Avalon Holographies Inc., St. John's (CA)

(72) Inventors: Andrew Bartlett, St. John's (CA); Jordan Peckham, Portugal Cove-St. Philips (CA)

(73) Assignee: Avalon Holographies Inc., St. John's (CA)

( * ) Notice: Subject to any disclaimer, the term of this patent is extended or adjusted under 35 U.S.C. 154(b) by 201 days.

(21) Appl. No.: 17/086,201

(22) Filed: Oct. 30, 2020

(65) Prior Publication Data

US 2022/0137258 A1    May 5, 2022

(51) Int. Cl.
| | | |
|---|---|---|
| *G03H 1/30* | (2006.01) | |
| *G02B 1/00* | (2006.01) | |
| *G09G 3/00* | (2006.01) | |
| *G02B 5/32* | (2006.01) | |

(52) U.S. Cl.
CPC .............. *G02B 1/002* (2013.01); *G02B 5/32* (2013.01); *G03H 1/30* (2013.01); *G09G 3/003* (2013.01); *G03H 2001/303* (2013.01); *G09G 2300/046* (2013.01); *G09G 2300/0452* (2013.01)

(58) Field of Classification Search
CPC ... G02B 5/22; G02B 5/20; G02B 5/32; G03H 2225/35; G03H 2001/2625; G03H 2001/303; G03H 1/30; G03H 1/26
USPC .......................................................... 359/15
See application file for complete search history.

(56) References Cited

U.S. PATENT DOCUMENTS

| | | |
|---|---|---|
| 7,839,549 B2 | 11/2010 | Mihajlovic |
| 9,103,973 B2 | 8/2015 | Fattal |
| 9,201,270 B2 | 12/2015 | Fattal |
| 10,120,198 B2 | 11/2018 | Santori |
| 10,578,793 B2 | 3/2020 | Baldwin |
| 10,598,980 B2 | 3/2020 | Chen |
| 2014/0111856 A1* | 4/2014 | Brug .................... G02B 5/1809 359/463 |
| 2014/0300947 A1 | 10/2014 | Fattal |
| 2015/0296203 A1 | 10/2015 | Lucente et al. |
| 2016/0334758 A1* | 11/2016 | Shaltout ............... G03H 1/0244 |
| 2017/0146806 A1 | 5/2017 | Lin |
| 2017/0219739 A1 | 8/2017 | Lin |
| 2018/0309981 A1* | 10/2018 | Meacham .............. G02B 30/27 |

(Continued)

FOREIGN PATENT DOCUMENTS

| | | |
|---|---|---|
| WO | 2018194987 A1 | 10/2018 |
| WO | 2020186272 A1 | 9/2020 |

OTHER PUBLICATIONS

Aieta, Francesco. Multiwavelength achromatic metasurfaces by dispersive phase compensation. Science Express. Feb. 19, 2015.

(Continued)

*Primary Examiner* — Jade R Chwasz

(57) ABSTRACT

A sub-hogel configuration for a high-definition light field display that can be used in the design of optical device and three-dimensional light field display technology. Three-dimensional holographic pixels (hogels) composed of monochromatic sub-hogels and a designed metasurface act as a directional optical element for a light field display. The sub-hogel structure design and method is suited for an achromatic metasurface to provide directional pixels for multiple view light field colored displays.

19 Claims, 24 Drawing Sheets

(56) References Cited

U.S. PATENT DOCUMENTS

2018/0341090 A1* 11/2018 Devlin ................ G03F 7/40
2019/0086683 A1   3/2019 Aieta
2019/0196068 A1*  6/2019 Tsai .................. G02B 1/002

OTHER PUBLICATIONS

Arbabi, Ehsan. Multiwavelength metasurfaces through spatial multiplexing. Scientific Reports. Sep. 6, 2016.
Fan, Zhi-Bin. A broadband achromatic metalens array for integral imaging in the visible. Light: Science and Applications. 2019.
Fattal, David. A multi-directional backlight for a wide-angle, glasses-free three-dimensional display. Nature 495, 348-351. 2013.
Khorasaninejad, Mohammadreza. Polarization-Insensitive Metalenses at Visible Wavelengths. American Chemical Society. Nano Letters. Oct. 24, 2016.
Khorasaninejad, Mohammadreza. Visible Wavelength Planar Metalenses Based on Titanium Dioxide. IEEE Journal of Selected Topics in Quantum Electronics, vol. 23, No. 3, May/Jun. 2017.
Levoy, Marc. Light Field Microscopy. ACM Transactions on Graphics 25(3), Proc. SIGGRAPH. 2006.

* cited by examiner

FIG. 7

OPTICAL METASURFACE WITH SUB-HOGELS

FIELD OF THE INVENTION

The present disclosure relates to three-dimensional light field display technology and more particularly, three-dimensional holographic pixels (hogels) composed of monochromatic sub-hogels for a light field display.

BACKGROUND OF THE INVENTION

Optical metasurfaces are engineered surfaces used to manipulate a wavefront. An optical metasurface generally consists of a two-dimensional lattice of pillar-type structures that interact with an impinging wavefront where the lattice constant and structure size are of subwavelength thickness relative to the electromagnetic wavelength range that the structures are designed to interact with. The design of dimensions of the pillars and the pillar spacing in the metasurface are varied to obtain desired optical properties. Optical metasurfaces can shape the amplitude, phase, and polarization of electromagnetic beams. The use of metasurfaces in light field display technology can enable the creation of virtually flat optical devices, can improve the performance of optical elements, and can manipulate light to provide optical systems with new properties. In development of light field display technology, metasurfaces have shown promising potential as lightweight and thin optical components that may combine several functionalities into a single device.

In one example of an optical metasurface, United States Patent Application Publication No. 20170219739 to Lin describes a randomly spatial-multiplexed metasurface where multiple optical elements are interleaved onto a single metasurface to utilize the full aperture of the metasurface for all optical elements though individually, as they only occupy a fraction of the total area. The intent of an achromatic metalens using this design is such that there is a dedicated lens for each colour channel interwoven. Light from all colour channels passes through all three lenses such that for each lens, one third of the light is focused at the intended achromatic focal point, and two thirds of the light is focused elsewhere.

In another example of an optical metasurface, United States Patent Application Publication No. 20170146806 to Lin describes an array of spatially multiplexed metalenses that may be used for a light-field display without separation of colour channels. The sizing of the sub-elements can have a different coded aperture, and Lin describes the implementation of an aperture based on modifying the phase of the wavefront.

SUMMARY OF THE INVENTION

It is an object of the present disclosure to provide a sub-hogel configuration for a high-definition light field display. Another object of the present invention is to provide a three-dimensional light field display and more particularly, an optical metasurface comprising three-dimensional holographic pixels (hogels) composed of monochromatic sub-hogels for a light field display.

In an aspect there is provided an optical device comprising: a hogel array comprising a plurality of hogels, each hogel partitioned into a plurality of monochromatic sub-hogels each comprising a plurality of monochromatic sub-pixels; and a directional optical element to direct light from the sub-pixels, the directional optical element partitioned into a plurality of colour regions, each colour region designed to direct light of a specific colour, the monochromatic sub-hogels and the plurality of colour regions configured such that the plurality of monochromatic sub-pixels are aligned with the colour region of the directional optical element designed to direct light of the specific colour of the monochromatic sub-pixels.

In an embodiment, the directional optical element is a metasurface.

In another embodiment, the metasurface comprises nanostructures.

In another embodiment, the nanostructures comprise titanium dioxide.

In another embodiment, each of the monochromatic sub-pixels is individually addressable.

In another embodiment, the plurality of monochromatic sub-hogels comprise at least one monochromatic red sub-hogel, at least one monochromatic green sub-hogel, and at least one monochromatic blue sub-hogel.

In another embodiment, each monochromatic sub-hogel comprises fewer monochromatic sub-pixels than can individually be discerned by a human eye.

In another embodiment, each monochromatic sub-hogel has between 2 and 144 monochromatic sub-pixels.

In another embodiment, each sub-pixel is less than 10 µm2.

In another embodiment, the monochromatic sub-pixels in each monochromatic sub-hogel are arrayed in a square configuration, rectangular configuration, or radial configuration.

In another embodiment, the directional optical element is a geometric metasurface, Pancharatnam-Berry metasurface, an inverse design metasurface, a dispersive phase compensating metasurface, or a combination thereof.

In another embodiment, the optical device is a light field display.

In another aspect there is provided a method for designing a partitioned optical metasurface comprising: defining a phase function for the metasurface; specifying a material for nanostructures in the metasurface; determining a fabrication configuration such that the metasurface is partitioned into a plurality of colour regions; determining nanostructure parameters for each colour region; generating a transmission map for the metasurface based on the nanostructure parameters; designing each colour region based on the nanostructure parameters and the transmission map to achieve the phase function, each colour region designed to direct light of a specific optical bandwidth; calculating the figures of merit for the designed metasurface; and generating an output metasurface design for the metasurface.

In an embodiment, the nanostructure parameters for each colour region are different.

In another embodiment, the material for the nanostructures is titanium dioxide.

In another embodiment, the metasurface is partitioned into red colour regions, green colour regions, and blue colour regions.

In another embodiment, the method further comprises, after calculating the figures of merit for the designed metasurface, adjusting the nanostructure parameters and recalculating the figures of merit.

In another embodiment, the parameters for the nanostructures for each colour region comprise nanostructure height, nanostructure shape, unit cell spacing, resonance boundary parameters, or a combination thereof.

In another embodiment, the nanostructures have a consistent height across the colour regions.

In another embodiment, the metasurface is a geometric metasurface, Pancharatnam-Berry metasurface, an inverse design metasurface, a dispersive phase compensating metasurface, or a combination thereof.

In another aspect there is provided a method for displaying a light field comprising: sub-dividing an integral image into a plurality of elemental images, each elemental image representing a two dimensional array of angular descriptors associated with a pair of directional coordinates; decomposing each elemental image into a plurality of colour-channel specific elemental images; sending each elemental image to a hogel, each hogel comprising a plurality of sub-pixels and partitioned into monochromatic sub-hogels comprising a plurality of monochromatic sub-pixels, wherein the colour-channel specific elemental images is sent to a same colour monochromatic sub-hogel; and creating a light field for display.

In an embodiment, the monochromatic sub-pixels are adjacent to one another in the monochromatic sub-hogels.

In another embodiment, each of the plurality of elemental images is equally sized.

In another embodiment, the colour-channel specific elemental images comprise a red colour channel, a green colour channel, and a blue colour channel.

In another embodiment, the method further comprises individually addressing the sub-pixels.

In another aspect there is provided an optical display device comprising a hogel array comprising a plurality of hogels, each hogel partitioned into a plurality of monochromatic sub-hogels, each monochromatic sub-hogel comprising a plurality of monochromatic sub-pixels.

BRIEF DESCRIPTION OF THE DRAWINGS

These and other features of the invention will become more apparent in the following detailed description in which reference is made to the appended drawings.

FIG. 7: illustrates the transformation of an 6×6 pixel hogel elemental image into a partial-elemental image then to a sub-hogel image.

DETAILED DESCRIPTION OF THE INVENTION

Figure 1:
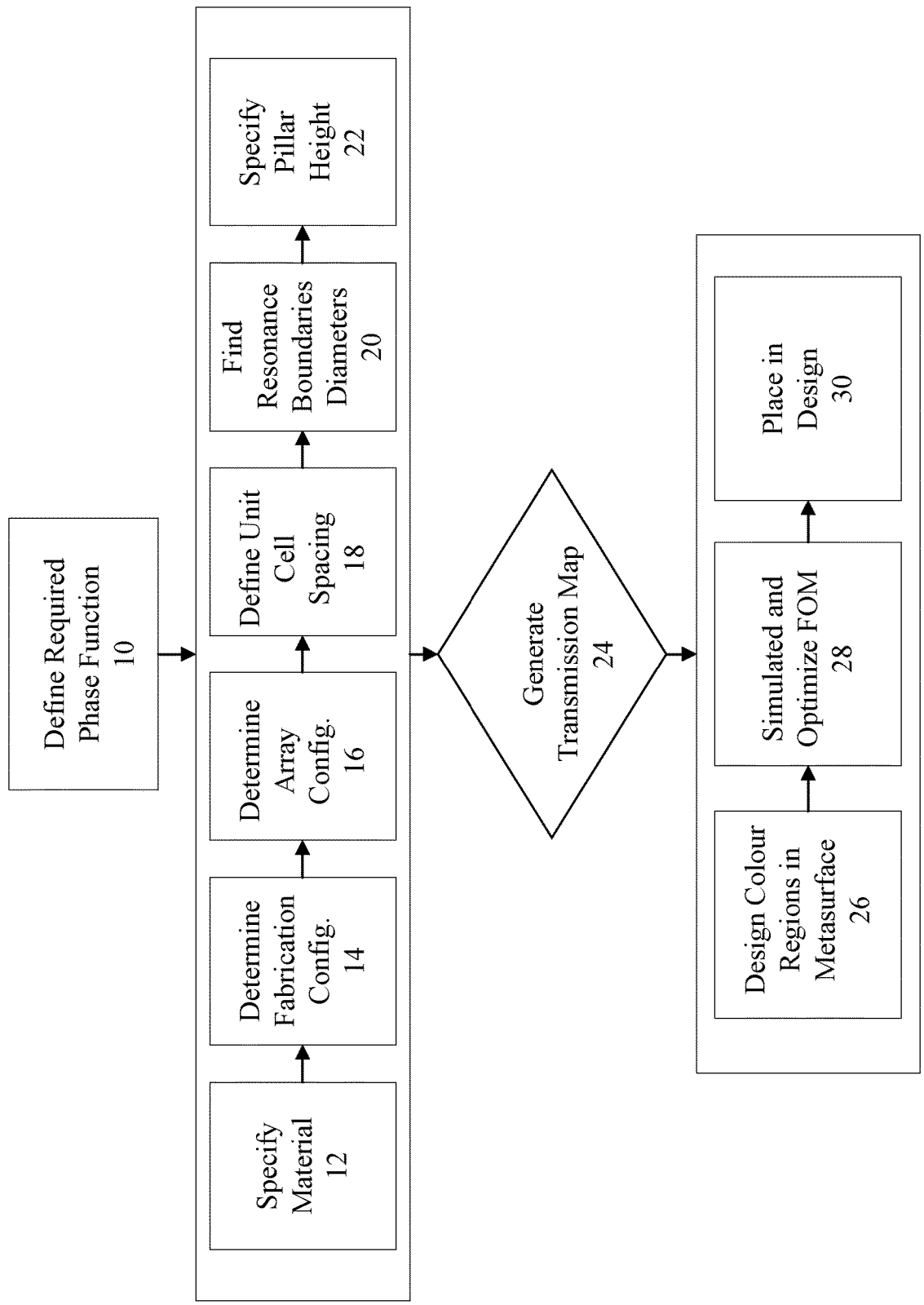
FIG. 1: illustrates a method for designing a metasurface suited for use in a light field display.

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one," but is also consistent with the meaning of "one or more," "at least one," and "one or more than one."

As used herein, the terms "comprising," "having," "including" and "containing," and grammatical variations thereof, are inclusive or open-ended and do not exclude additional, unrecited elements and/or method steps. The term "consisting essentially of" when used herein in connection with a composition, device, article, system, use, or method, denotes that additional elements and/or method steps may be present, but that these additions do not materially affect the manner in which the recited composition, device, article, system, method, or use functions. The term "consisting of" when used herein in connection with a composition, device, article, system, use, or method, excludes the presence of additional elements and/or method steps. A composition, device, article, system, use, or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to.

The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used herein, the term "pixel" refers to a light source and light emission mechanism used to create a display. Pixels can comprise one or more sub-pixels, and most commonly comprise one red sub-pixel, one green sub-pixel, and one blue sub-pixel.

As used herein, the term "sub-pixel" refers to a structure comprised of a light emitting device housed within an optical microcavity. The optical microcavity is operatively associated with a plurality of reflective surfaces to substantially collimate, manipulate or tune the light. At least one of the reflective surfaces is a light propagating reflective surface connected to the optical microcavity to propagate the light out of the microcavity. The present disclosure provides individually addressable red, green, and blue (RGB) sub-pixels. The sub-pixel size, as presently described, is in a nanoscale to several microns range, which is significantly smaller than the pixel size previously known in the art.

As used herein, the term "light field" at a fundamental level refers to a function describing the amount of light flowing in every direction through points in space, free of occlusions. Therefore, a light field represents radiance as a function of position and direction of light in free space. A light field can be synthetically generated through various rendering processes or may be captured from a light field camera or from an array of light field cameras.

As used herein, the term "light field display" is a device which reconstructs a light field from a finite number of light field radiance samples input to the device. In general, the radiance samples represent the colour components red, green and blue (RGB), though it is understood that other combinations of colors may be possible. For reconstruction in a light field display, a light field can also be understood as a mapping from a four-dimensional space to a single RGB colour. The four dimensions include the vertical and horizontal dimensions of the display and two dimensions describing the directional components of the light field. A light field is defined as the function:

$$LF:(x,y,u,v) \to (r,g,b)$$

where x, y are the cartesian or positional coordinates of the location in the light field, and u, v are the directional or angular descriptors. For a fixed $x_f$, $y_f$, $LF(x_f, y_f, u, v)$ represents a two dimensional (2D) image referred to as an "elemental image". The elemental image is a directional image of the light field from the fixed $x_f$, $y_f$ position. When a plurality of elemental images are connected side by side, the resulting image is referred to as an "integral image". The integral image can be understood as the entire light field required for the light field display.

As used herein, the term "metasurface" refers to an engineered surface used to manipulate a wavefront. The surface consists of a two-dimensional (2D) lattice of nanostructures that interact with an impinging wavefront where the lattice constant and structure size are subwavelength. The characteristics of each subwavelength structure are selected to impart a specific local phase and amplitude onto the wavefront. By controlling the phase and amplitude of the wavefront at each lattice site, the shape of the wavefront can be manipulated. Metasurfaces can be designed for various types of wavefront, including but not limited to electromagnetic and acoustic wavefronts. Optical metasurfaces operate on light waves and can be used to flatten existing three-dimensional (3D) components such as lenses. Optical metasurfaces can be fabricated using semiconducting techniques thus reducing fabrication costs.

As used herein, the term "OLED" refers to an Organic Light Emitting Diode, which is an opto-electronic device which emits light under the application of an external voltage. OLEDs can be divided into two main classes, those made with small organic molecules and those made with organic polymers. An OLED is a light-emitting diode in which the emissive electroluminescent layer comprises a film of organic compound that emits light in response to an electric current. Generally, an OLED is a solid-state semi-conductor device comprised at least one conducting organic layer disposed between and electrically connected to an anode and a cathode. When a current is applied, the anode injects holes, and the cathode injects electrons into the organic layers. The injected holes and electrons each migrate toward the oppositely charged electrode. When an electron and hole localize on the same molecule, an exciton, which is a localized electron-hole pair having an excited energy state, is formed. Light is emitted when the exciton relaxes via a photoemissive mechanism. There are various types of OLEDs which include but are not limited to active-matrix OLEDs (AMOLEDs), top-emitting OLEDs, and bottom-emitting OLEDs. AMOLEDs have full layers of cathode, organic molecules, and anode. The anode layers have a thin film transistor (TFT) plane in parallel to it so as to form a matrix. This helps in switching each pixel to its on or off state as desired, thus forming an image. The pixels switch off whenever they are not required or there is a black image on the display which increases the battery life of the device. This is the least power consuming type among OLEDs and also has quicker refresh rates which makes them suitable for video as well. Uses for AMOLEDs include computer monitors, large-screen TVs, and electronic signs or billboards. Top-emitting OLEDs have a substrate that is either opaque or reflective. Top-emitting OLEDs are better suited for active-matrix applications as they can be more easily integrated with a non-transparent transistor backplane. Manufacturers may use top-emitting OLED displays in smart cards. An OLED is bottom-emitting if the emitted light passes through the transparent or semi-transparent bottom electrode and substrate.

As used herein, the term "hogel" is an alternative term for a holographic pixel, which is a cluster of traditional pixels with directional control. An array of hogels can generate a light field. It then follows that the "hogel pitch" is defined as the distance from the center of one hogel to the center of an adjacent hogel.

As used herein, the term "sub-hogel" (or sub-hogel) is a cluster of traditional sub-pixels with directional control. An array of sub-hogels can comprise a hogel.

As used herein, the term "monochromatic" refers to a narrow bandwidth colour channel and describes a light emission with narrow optical bandwidth.

As used herein, the term "elemental image" represents a two dimensional (2D) image, $LF(x_f, y_f, u, v)$, for a fixed $x_f$, $y_f$, $LF(x_f, y_f, u, v)$. The elemental image is a directional image of the light field from the fixed $x_f, y_f$ position.

As used herein, the acronym "FWHM" refers to 'full width half maximum', which is an expression of the extent of a function given by the difference between the two extreme values of the independent variable at which the dependent variable is equal to half of its maximum value.

As used herein, the acronym "FRED" refers to Fred Optical Engineering Software. FRED is a commercial 3D computer aided design (CAD) computer program for optical engineering used to simulate the propagation of light through optical systems. FRED can handle both incoherent and coherent light using Gaussian beam propagation.

As used herein, the term "transmissivity" refers to the percentage of light transmitted per the incident light.

As used herein, the term "wavelength" is a measure of distance between two identical peaks (high points) or troughs (low points) in a wave, which is a repeating pattern of traveling energy, such as, for example, light or sound.

As used herein, the term "simulation" refers to the production of a computer model of something, especially for the purpose of study or to develop and refine fabrication specifications. Various simulation methods can be used, including but not limited to the following. The finite-difference time-domain (FDTD) method is used to solve problems in electromagnetics and photonics, solving Maxwell's equations in complex geometries. FDTD is a versatile finite difference method in the time domain which treats nonlinear material properties in a natural way and allows a user to measure the system response over a wide range of frequencies. A comparable technique is Rigorous Coupled Wave Analysis (RCWA), which is a semi-analytical method, generally employed to solve field diffraction problems of a periodic structure. RCWA decomposes fields into a set of plane waves, representing the fields by a sum of spatial harmonics in Fourier-space. RCWA benefits from a decreased simulation complexity and time but suffers inaccuracy for more complex geometries. Ray Tracing simulation, such as the simulations performed by FRED, are used to prototype optical mechanical systems. Given an initial set of light rays, ray tracing simulates the resulting light field by propagating light rays in space and computing their interactions with any surface they impinge on.

It is contemplated that various embodiments of the compositions, devices, articles, methods, structures, apparatuses, and uses disclosed herein can be implemented by one skilled in the art, as is, or by making such variations or equivalents without departing from the scope of the invention.

Herein is described a sub-hogel configuration for a high-definition light field display. Also provided is an optical device and three-dimensional light field display technology and more particularly, three-dimensional holographic pixels (hogels) composed of monochromatic sub-hogels and a designed metasurface acting as a directional optical element for a light field display. The described sub-hogel structure design and method is suited for an achromatic metasurface to provide directional pixels for multiple view light field coloured displays. An efficient broadband achromatic metalens has so far eluded the metasurface research community. To simplify the design of the metasurface for an organic light emitting diode (OLED) or projector-based display, a hogel containing an array of monochromatic sub-hogels is described, wherein each sub-hogel includes a unique monochromatic metalens.

A hogel is a directional light emitting structure that emits light of different colour and intensity in different directions comprised of a plurality of sub-pixels. In the present disclosure hogels are shown with a plurality of RGB sub-pixels, however it is understood that hogels can comprise different combinations of number and color of sub-pixels. A light field display is comprised of an array of hogels. An observer will see a spot of light emitted from each hogel within the array. The cumulation of each spot of light from the hogel array will create an image seen by the observer. A second observer at another location will see spots of light from each hogel within the array, but because they are observing the light field display from another location, and therefore a different direction, they observe a different image than the first observer. For an n×m array of hogels, both observers will see an image produced by an n×m array of light spots. A hogel consists of a 2D pixel array (or sub-pixel array) and a directional optical element such as a lens or metasurface. Light emitted by each pixel or sub-pixel travels normal to the pixel array. The light of each pixel passes through a directional optical element and is directed in a predefined direction. A hogel with a p×q pixel array will send light in p×q different directions. A light field display consists of a (n*p)×(m*q) pixel array and an n×m array of directional optical elements, such that there are p×q pixels per hogel in the n×m hogel array. The hogels are a product of combining the pixel array with the array of directional optical elements. Each pixel consists of sub-pixels, typically three adjacent RGB sub-pixels form a pixel. A pixel array is therefore also a sub-pixel array. In a sub-hogel light field display, the sub-pixel array that makes up each hogel is reorganized such that instead of grouping RGB sub-pixels of the same pixel together, like-coloured sub-pixels are grouped into clusters in order to accommodate the directional optical element (in this case, a metasurface).

In accordance with the present disclosure, a metasurface can be thought of as an ordered spatial-multiplexed metasurface wherein metalenses for each colour channel are interleaved onto a single metasurface. A metasurface is described herein as an example of a directional optical element, however it is contemplated that other directional optical elements may be used. The aperture is determined by the sub-hogel size and each sub-hogel interacts with a single colour channel. The presently described metasurface is segmented to accommodate colour regions such each segment has a corresponding cluster of like-coloured sub-pixels, allowing for the metasurface colour region segment to be tailored to the wavelength of the corresponding sub-pixel cluster. A sub-hogel is a like-coloured cluster of sub-pixels coupled with a corresponding metasurface colour region segment.

One significant barrier faced in designing directional optical elements and in particular metasurfaces for light field display technology has been achieving a nanoscale pixel size to provide the pixel density necessary for a high-definition light field display, which is on the order of billions of pixels. The presently described design achieves a sub 10-micron pixel size while providing adequate sub-hogel size to facilitate a metasurface design that is fabricable with known fabrication tools and methods. In order to tailor and achieve an achromatic metasurface with directional pixel capability, it is proposed to cluster like-coloured sub-pixels (R, G, B sub-pixels) and layer them with an area of the metasurface tailored to the spectrum of the light emitted by the like-coloured (monochromatic) sub-pixel cluster that direct the emitted light, herein referred to as a monochromatic sub-hogel, monochromatic sub-hogel array, and/or monochromatic sub-hogel cluster.

The present disclosure provides the design considerations and methods necessary for a design comprising a monochromatic sub-hogel array coupled with an achromatic metasurface to provide directional pixels for a high-definition, multiple view light field display. A metasurface is therefore a strong candidate to augment conventional refractive or diffractive optics. A metasurface concept utilizing monochromatic sub-hogels overcomes limitations present in achieving the high angular resolution required for a compelling light field display.

A monochromatic sub-hogel design is presently described wherein the clusters of like-coloured sub-pixels may be combined with an optical surface, such as a geometric metasurface, to achieve the directional pixel capability required. The techniques described throughout this disclosure are advantageous compared with other achromatic metasurfaces. These advantages include, but are not limited to: an expected increase in efficiency, no requirement for a polarized light source, and no limitation on the sub-pixel size by the ability of the metasurface to compensate for the full visible spectrum. It should be noted that when used in a display, the reduced pixel size allows the system to output a greater number of light beams in a greater number of distinct directions, thus improving upon pixels previously known in the art by allowing the generation of higher angular resolution displays with improved effective resolution of multi-dimensional objects. The increased number of light-field display views allows a viewer located at any viewing position to simultaneously receive multiple views; this is known as a super multi-view (SMV) display. A SMV display, providing improved angular resolution, eliminates the accommodation-convergence conflict and produces displays with a higher quality depth of field.

Fan et al. describes a metalens array that could be used for a light field display using a dispersive phase compensation achromatic metasurface (Fan, Zhi-Bin. A broadband achromatic metalens array for integral imaging in the visible. Light: Science and Applications. 2019). They achieved an average efficiency of 47% and a numerical aperture (NA) of 0.08, which is much too small to achieve the large field of view required in light field display applications. United States Patent Application Publication No. 20170146806 to Lin also describes a metalens array that could be used for a light field display using a dispersive phase compensation achromatic metasurface. They achieved an average efficiency of 39% and a NA of 0.21, still too small to achieve the large field of view required in light field display applications. The NA of phase compensation achromatic metalenses is limited by the maximum lens size the nanostructures can accommodate while still providing adequate phase compensation to achieve achromaticity, which is directly related to the nanostructure height. Higher NA phase compensation achromatic metalenses require advancements in fabrication to achieve taller nanostructures.

The present invention utilizes sub-hogels that tailor separate regions of metasurfaces to a particular colour channel which allows for a highly efficient and greatly simplified metasurface design. As each region of a metasurface is monochromatic, the metasurface can be a geometric metasurface, meaning that the phase is controlled by varying the size of the nanostructures that compose the metasurface. Geometric metasurfaces are efficient Khorasaninejad et al. previously reported a metalens with 90% efficiency that does not require a polarized source avoiding additional losses and components (Khorasaninejad, Mohammadreza. Polarization-Insensitive Metalenses at Visible Wavelengths. American Chemical Society. Nano Letters. Oct. 24, 2016.). However, these devices suffer from chromatic aberrations, which are inconsequential to this invention as each geometric metasurface is tailored to a narrow bandwidth colour channel. The present invention can also be used with Pancharatnam-Berry metasurfaces that control the phase of a polarized wavefront by changing the orientation of birefringent nanostructures of a fixed size. Other possible metasurface types include but are not limited to a combination of geometric and Pancharatnam-Berry metasurfaces (changing size and orientation of nanostructures), inverse design metasurfaces, and dispersive phase compensating metasurfaces.

Various features of the invention will become apparent from the following detailed description taken together with the illustrations in the Figures. The design parameters, design method, construction, and use of the microcavity OLED design process and structures disclosed herein are described with reference to various examples representing embodiments which are not intended to limit the scope of the invention as described and claimed herein. The skilled technician in the field to which the invention pertains will appreciate that there may be other variations, examples and embodiments of the invention not disclosed herein that may be practiced according to the teachings of the present disclosure without departing from the scope of the invention.

FIG. 1 illustrates a method for designing a metasurface suited for use in a light field display. The method first requires the definition of the required phase function 10. A phase function will be selected for the metasurface under design based on the desired function of the metasurface. In an example, if the metasurface is intended to function as a lens, the phase function would focus light imparted on the metasurface to a designed focal length, or focal spot. Following the selection of the phase function, the material type is specified 12 which then allows one to determine the fabrication constraints 14. The ideal material for a metasurface for a light field display has a refractive index ensuring strong confinement to achieve a full a phase shift within the bounds imposed by fabrication and pixel size, while maintaining a high transmission. The present disclosure describes the use of Titanium Dioxide ($TiO_2$) to manufacture the nanostructures in the metasurface, however it is understood that other materials and combinations of materials could be used in the manufacture of the nanostructures, optionally in combination with a surface mask. Metasurface materials can include but are not limited to $TiO_2$, $SiO_2$, Si, GaN, $AlO_3$, and $Si_3N_4$, or other material with suitable properties. The described metasurface comprises nanostructures, in this case nanopillars, however it is understood that the described metasurface nanostructures can have various shapes, including but not limited to oval, square, rectangular and square horizontal cross-sections, as well as straight, angular, curved, pyramidal, and frustoconical vertical cross-sections. The metasurface can also optionally be fabricated on Silicon Dioxide ($SiO_2$), which adds additional flexibility in the deposition methods of the $TiO_2$. Possible deposition methods include but are not limited to the $TiO_2$ being deposited directly above the display or aligned in an additional step.

Once the fabrication constraints have been determined, the array configuration is then determined 16 and the unit cell spacing is defined 18. The unit cell, denoted as U, specifies the center to center distance between adjacent pillars or nanostructures in the metasurface. The unit cell size is analogous to the lattice constant in periodic crystal structure, or the grating period in diffraction gratings, wherein the duty cycle is the feature dimension divided by the grating period. An approximation for the minimum and maximum unit cell size can be determined using the equations described below. The optimal unit cell size can then be determined using FDTD simulations, comparing the transmission maps for differing unit cell sizes. The optimal unit cell size will be the size in which the transmission stays as near to 1 as possible from the minimum and maximum diameter for single mode resonance. Previous reports of metasurface designs have used different unit cell sizes for each wavelength. In one example, Khorasaninejad et al. report U=180 nm, 250 nm, and 350 nm for 405 nm, 532 nm, and 660 nm wavelengths, respectively (Khorasaninejad, Mohammadreza. Visible Wavelength Planar Metalenses Based on Titanium Dioxide. IEEE Journal of Selected Topics in Quantum Electronics, VOL. 23, No. 3, May/June 2017).

Figure 2:
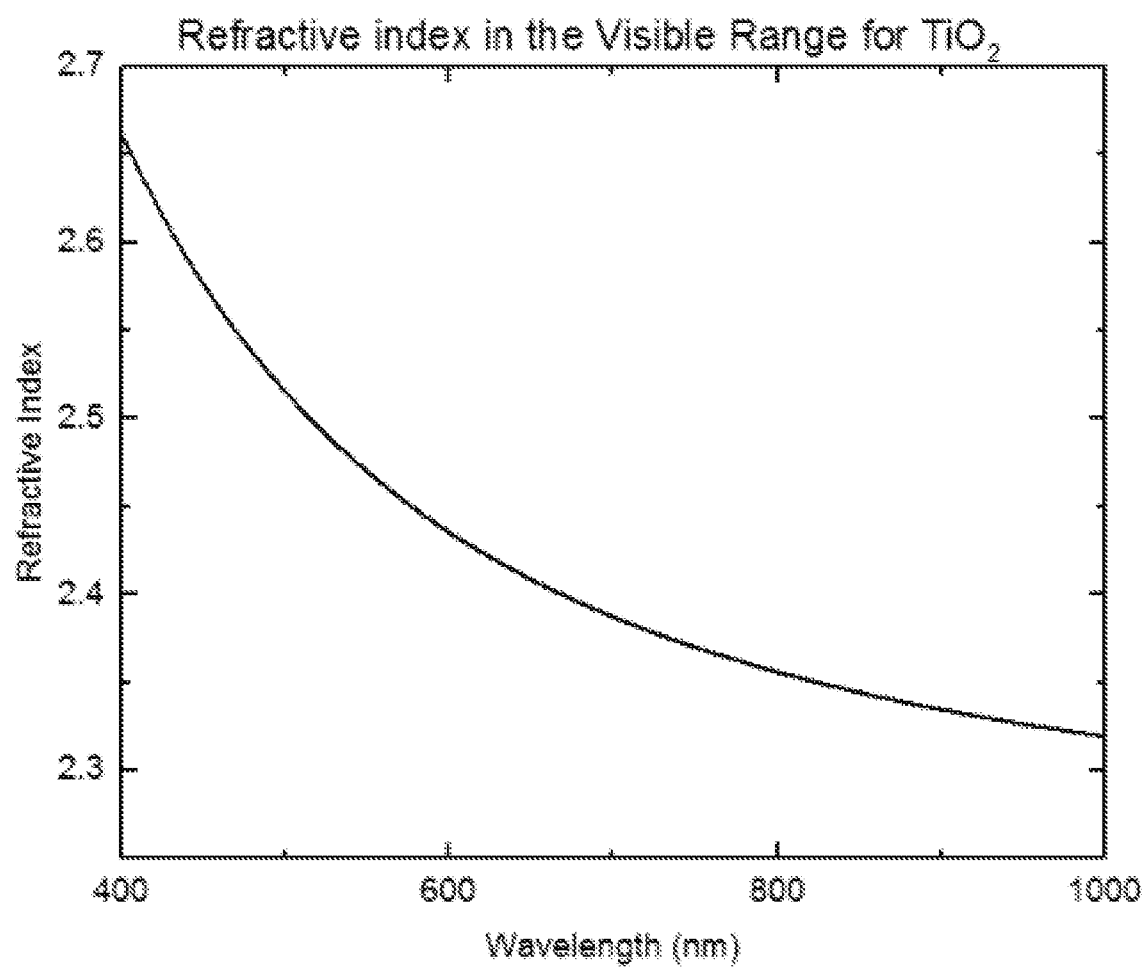
FIG. 2: illustrates a graphical representation of a refractive index plot for $TiO_2$.

FIG. 2 illustrates a graphical plot of refractive index versus the wavelength of light (nm) in the visible range for Titanium Dioxide ($TiO_2$). For visible wavelength nanostructure-based metasurfaces for light field display, $TiO_2$ has a negligible absorption coefficient, a refractive index in the range of 2.3-2.7 as illustrated, and has been shown to achieve high aspect ratio, anisotropic structures with minimal surface roughness.

Turning back to the method shown in FIG. 1, for rectangular dielectric resonators, Aieta et al. report using FDTD sweeps to determine the optimal unit cell parameters in silicon, where the resonance in the feature and the rectangular dielectric was accounted for (Aieta, Francesco. Multiwavelength achromatic metasurfaces by dispersive phase compensation. Science Express. 19 Feb. 2015). U.S. Pat. No. 9,103,973 to Fattal et al. report that the lattice constant should be selected such that the optical element does not scatter light in an unwanted manner, which can be prevented by selecting the lattice constant based on a no scatter limit defined by:

$$U_{max} = \frac{\lambda}{n_{substrate}}$$

for a square lattice, and $$U_{max} = \frac{2\lambda}{\sqrt{3} * n_{substrate}}$$

for a hexagonal lattice.

Khorasaninejad et al. describes a method in which the nanostructure height and unit cell size are optimized at the design wavelength, where the largest diameter is equal to the unit cell size, which must be small enough to meet the Nyquist Sampling Criterion (Khorasaninejad, Mohammadreza. Polarization-Insensitive Metalenses at Visible Wavelengths. American Chemical Society. Nano Letters. Oct. 24, 2016). The Nyquist criterion states that a repetitive waveform can be correctly reconstructed provided that the sampling frequency is greater than double the highest frequency to be sampled, thus:

$$U_{max} = \frac{\lambda}{2NA}$$

where NA is defined as the numerical aperture of a metalens.

In accordance with the present disclosure, the minimum unit cell bounds can be defined based on the nanostructure geometry. The minimum unit cell size is defined such that at the maximum distance between nanostructures, $a_{max}$, and less than the gap between neighbouring nanostructures, in this case nanopillars, synonymous with the distance between pillars and at inter-pillar distances less than $a_{max}$, light at the design wavelength will not resonate between the nanopillars. No resonance occurs between the nanopillars such that the sole contribution to the output is from the nanopillar itself. Therefore, the no resonance condition requires that the optical path length between the pillars is less than a quarter wavelength, or:

$$\frac{\lambda}{4} = a_{max} * n_{gap}$$

where $n_{gap}$ is the refractive index of the material surrounding the nanopillars. Using the minimum radius $r_{min}$ for single mode resonance:

$$r_{min} = \frac{0.9\lambda}{2\pi\sqrt{n_{pillar}^2 - n_{gap}^2}}$$

The minimum unit cell size can then be defined as $$U_{min} = a_{max} + d_{min}$$

which is:

$$U_{min} = \frac{\lambda}{4n_{gap}} + d_{min}$$

This condition also sets $d_{min}$ for larger unit cell:

$$d_{min} = U - \frac{\lambda}{4n_{gap}}$$

Once the unit cell spacing has been defined 18, the boundaries of resonant conditions for the nanopillars must also be defined 20. Calculating resonance boundary parameters, including diameter and shape of the nanostructures in the metasurface, comprises setting the lower and upper limits of the cross-sectional area of each nanostructure so that the nanostructure reacts favourably and efficiently with the intended wavelength of colour of light. For the design of a metasurface for a 3D light field display, a single mode resonance for each nanostructure is desired. Therefore, determining the minimum diameter, $d_{min}$, for each pillar in which no resonance occurs, and similarly the maximum diameter, $d_{max}$, in which single mode resonance becomes multi-mode resonance, is required.

The transverse refractive index profiles of many optical fibers are radially symmetric and the index profiles of nearly all fibers exhibit only a small index contrast, such that the fiber can be assumed to be only weakly guiding. This simplifies the calculation of the fiber modes such that linearly polarized (LP) modes are obtained. In the case of stronger guidance, transverse electric and transverse magnetic modes must be distinguished, wherein either the electric or the magnetic field is exactly perpendicular to the fiber axis. There are also hybrid modes having non-zero longitudinal components of both electric and magnetic fields. As used herein, HE and EH are combinations of the symbols for electric (E) and magnetic (H) fields. The dominant field along the direction of propagation is represented by the first symbol. For example, HE has a relatively stronger longitudinal magnetic field compared to the longitudinal electric field.

The wave equation for the complex electric field profile in cylindrical coordinates is:

$$\frac{\delta^2 E}{\delta r^2} + \frac{1}{r}\frac{\delta E}{\delta r} + \frac{1}{r^2}\frac{\delta^2 E}{\delta \phi^2} + \beta E = 0$$

where $\beta$ is the imaginary part of the propagation constant. At a given wavelength for discrete values of $\beta$ there is a solution to the radial equation, representing guided modes of the fiber. All guided modes have $\beta$ values which lie between the plane wave values of the cladding and core.

The V-number is a dimensionless parameter which can be interpreted as a kind of normalized optical frequency and is essential for many fiber properties. It is defined as:

$$V = \frac{2\pi r}{\lambda}NA = \frac{2\pi r}{\lambda}\sqrt{n_{core}^2 - n_{cladding}^2} = \frac{2\pi r}{\lambda}\sqrt{n_{pillar}^2 - n_{gap}^2}$$

For V-values below 2.405, a fiber supports only one mode, LP01, per polarization direction, known as single mode or monomode fibers. For values greater than V=2.405, the number of supported modes can be approximated as:

$$M = \frac{V^2}{2}$$

Using V=2.405 in the above equation for V, the maximum radius for single mode fiber can be found using:

$$r_{max} = \frac{2.405\lambda}{2\pi\sqrt{n_{pillar}^2 - n_{gap}^2}}$$

Similarly, the minimum radius of which single mode resonance begins is V=0.9, and therefore using:

$$r_{max} = \frac{0.9\lambda}{2\pi\sqrt{n_{pillar}^2 - n_{gap}^2}}$$

the minimum radius of resonance can be determined.

The nanostructure pillar height in the metasurface must be specified 22 following the determination of the diameters of the resonance boundaries. The heights of the nanostructures must be sufficiently tall to ensure a phase coverage over attainable diameters. Moreover, due to fabrication constraints, it is desired that the height of the pillars be equal, or at the most have a single height per design wavelength.

The collective methodology of Harvard's Capasso group relies on simulation results to ensure this range, noting h=400 nm, 600 nm, and 600 nm for 405 nm, 532 nm, and 660 nm wavelengths respectively (Khorasaninejad, Mohammadreza. Visible Wavelength Planar Metalenses Based on Titanium Dioxide. IEEE Journal of Selected Topics in Quantum Electronics, VOL. 23, No. 3, May/June 2017). It was suggested that the height can be estimated based on the phase accumulation along the length of a slab, such that for $2\pi$ phase shift, the height (Khorasaninejad, Mohammadreza. Polarization-Insensitive Metalenses at Visible Wavelengths. American Chemical Society. Nano Letters. Oct. 24, 2016) is:

$$H = \frac{\lambda}{\Delta n_{eff}}$$

However, the effective index can range from approximately 1 to the refractive index value of the material, yielding an unreliable estimate of the required height. U.S. Pat. No. 9,103,973 to Fattal et al. reports that the thickness of the metasurface should be no taller than:

$$H < \frac{\lambda}{n_{pillar} - n_{substrate}}$$

To ensure a large differential phase, the above equation is used for 540 nm, H<526 nm. The value is smaller than has been determined here in simulation and is currently known. However, one source of discrepancy with this equation could be the $n_{pillar}$ is the effective index of the metasurface, and not simply the refractive index of the nanostructure (pillar) material. A non-periodic metasurface is expected to have an effective index that is not constant at any specific point. Further, if the effective index value is calculated for the entire metasurface, and further simplified to the ratio of filled to unfilled area, the resulting estimate of the effective index would not be reliable.

Through a series of steps, an equation to determine the effective index based on the pillar diameter and refractive index is found. This equation is then used to determine the minimum height required to achieve a $2\pi$ phase shift within the single mode resonance region for each wavelength. Further, the phase accumulation per unit length, $\Delta\phi/H$, is shown to be the slope of the linear fit to the data for pillar height versus total phase shift.

To determine the effective index of a nanopillar, a series of equations are used. The theoretical background describing the evolution of this calculation first describes that the optical modes in a dielectric slab are solutions to the eigenvalue equation derived from Maxwell's equations, subject to the boundary conditions imposed by the waveguide geometry. Maxwells' equations can be written as:

$$\nabla \times = i\omega\varepsilon_0 n^2 \vec{E}$$

$$\nabla \times \vec{E} = i\omega\mu\vec{H}$$

where n is the value of the refractive index profile.

Since the structure is homogeneous along the z-axis, the solutions to the wave equations are:

$$\vec{E}(x,t) = \vec{E}_m(x)e^{i(\omega t - \beta z)}$$

$$\vec{H}(x,t) = \vec{H}_m(x)e^{i(\omega t - \beta z)}$$

where $\beta$ is the propagation constant (the z component of the wavevectors), and $\vec{E}_m(x)$ and $\vec{H}_m(x)$ are wavefunctions of the guided modes.

Eliminating $\vec{H}$, the wave equation becomes:

$$\left(\frac{\delta^2}{\delta x^2} + \frac{\delta^2}{\delta y^2}\right)\vec{E}(x,y) + (k_o^2 n^2(r) - \beta^2)\vec{E}(x,y) = 0$$

A solution is sought for the above equation in each segment of the dielectric structure. It is known that for confined modes, the field amplitude falls off exponentially outside the guiding structure and varies sinusoidally inside the structure. For TE (transverse electric) modes, the mode function is:

$$E_m(x) = A\sin hx + B\cos hx, \text{ for } |x| < d/2$$

$$Ce^{-qx}, \text{ for } x > \frac{d}{2}$$

$$De^{qx}, \text{ for } x < -d/2$$

where h and q are related to the propagation constants as:

$$h^2 = \left(\frac{n_2\omega}{c}\right)^2 - \beta^2$$

$$q^2 = -\beta^2 - \left(\frac{n_1\omega}{c}\right)^2$$

Using the boundary conditions and the mode condition equation above for TE symmetric modes (A=0, C=D):

$$h\tan\left(\frac{hd}{2}\right) = q$$

For asymmetric modes:

$$h\cot\left(\frac{hd}{2}\right) = -q$$

therefore, the propagation constant can be determined if u=½hd and v=½qd, then boundary conditions and the mode condition equation above for TE symmetric modes becomes:

$$u \tan u = v$$

Boundary conditions and the mode condition equation above for TE asymmetric modes becomes:

$$-u \cot u = v$$

Finally, the definition of the V number can be found to be:

$$V^2 = u^2 + v^2 = \left(\frac{1}{2}hd\right)^2 + \left(\frac{1}{2}qd\right)^2 = \left(\frac{\pi d}{\lambda}\right)^2 (n_2^2 - n_1^2)$$

Since u and v must be positive, the propagation constant can now be determined by finding the intersection points the boundary conditions and the mode condition equations above for TE symmetric and asymmetric modes with the resulting V number from definition of the V number equation, defined as a circle with radius V, such that:

$$u^2 + v^2 = V^2$$

Using the u values for the intersections of the confined modes, and u=½hd, the propagation constant may be calculated using:

$$\beta^2 = \left(\frac{2\pi n_2}{\lambda}\right)^2 - \left(\frac{2u}{d}\right)^2$$

To define the confined modes, it is useful to define the normalized propagation constant:

$$\beta = n_{eff} = \frac{\beta\lambda}{2\pi}$$

Once the pillar height has been specified 22, the transmission map is generated 24. When the parameters for the nanostructures are defined, the range of accessible nanostructures is thereby defined. The transmission map maps the complex transmission coefficient as a function of nanostructure parameters. The magnitude of the complex transmission coefficient determines the optical efficiency of the nanostructure while the phase of the complex transmission coefficient determines the phase imparted on the emitted light from the sub-pixels. These maps are generated using a finite-difference time-domain (FDTD) analysis software. Due to the complexity of metasurface structures, analytical techniques are often incapable of providing valid solutions, therefore numerical modelling techniques are employed. FDTD is one of the most popular for modelling electromagnetic structures due to its ability to deal with inhomogeneous, anisotropic, and frequency dispersive materials. However, for modelling of metamaterials with high contrast between the material properties of the structure and free space, numerical simulations become challenging, and the accuracy of the conventional FDTD method is usually insufficient. The simulation accuracy can be increased using an extremely fine mesh but requires increasing computational resources. Therefore, conventional FDTD schemes must be properly developed to accurately model the metamaterials.

Phase and transmission maps are used to create a data set from which high transmission parameters with desired phase can be chosen. A series of sweeps are created which sequentially increase the diameter of the nanopillar at a specific unit cell spacing and height. These simulations use periodic boundary conditions to emulate the field produced by an infinite array of identical nanopillars, from which the phase and transmission parameters are extracted. The transition and phase maps are used to design non-periodic metasurfaces where neighbouring nanopillars differ in diameter;

therefore, a pillar will have different nearest neighbour interactions that may change its phase and/or transmission parameters. Ideally, the range of pillar diameters is small enough that the above design approximation is valid; however, this leaves room for further design optimization.

Using the FDTD generated transmission map as a nanostructure parameter Look Up Table, the colour regions in the metasurface can be designed 26. The colour regions in the metasurface are designed based on the nanostructure parameters and the transmission map to achieve the phase specified by the phase function, where each colour region designed to direct light of a specific optical bandwidth. The parameters for the nanostructures for each colour region can comprise but are not limited to nanostructure height, nanostructure shape, unit cell spacing, and resonance boundary parameters. To create the desired phase profile/wave front with a uniform transmission across the metasurface, the pillar diameter selected from the LUT minimizes the following equation:

$$T_m e^{i\phi_t} - T(d) e^{i\phi(D)}$$

where $T_m$ is the average transmission is, $\phi_t$ the desired phase, $T(d)$ is the transmission parameter from the LUT and $\phi(D)$ is the phase parameter from the LUT.

The desired phase $\phi_t$ is determined by the function of the metasurface. For a metalens of focal length f the desired phase is given by:

$$\phi_{t(x,y)} = \frac{2\pi}{\lambda} * \left( f - \sqrt{(x^2 + y^2 + f^2)} \right)$$

where x and y are the positional coordinates relative to the center of the metalens.

Finally, FDTD simulations of the metasurface are used to optimize the parameters of the nanostructure array to maximize the calculated Figures of Merit (FOM) 28 and the metasurface is placed in design 30. Figures of merit are a performance metric of the metasurface that are defined by the functionality of the metasurface. For example, the figures of merit of a metalens include but are not limited to its focal length, the full-width half maximum (FWHM) of the focal location, and the Strehl ratio (which is a comparison to the ideal intensity curve of the focal location). Given the design, the figures of merit can be calculated through the results of a design simulation. After calculating the figures of merit for the designed metasurface, the parameters for the nanostructures can be adjusted and the figures of merit can be thereafter recalculated to see if there is an improvement in the performance of the metasurface as a result of the nanostructure parameter adjustment. The optimization process of the metasurface can be an iterative process and the nanostructure parameters can be adjusted and subsequent FOM calculations can be performed many time to optimize the metasurface design.

Figure 3:
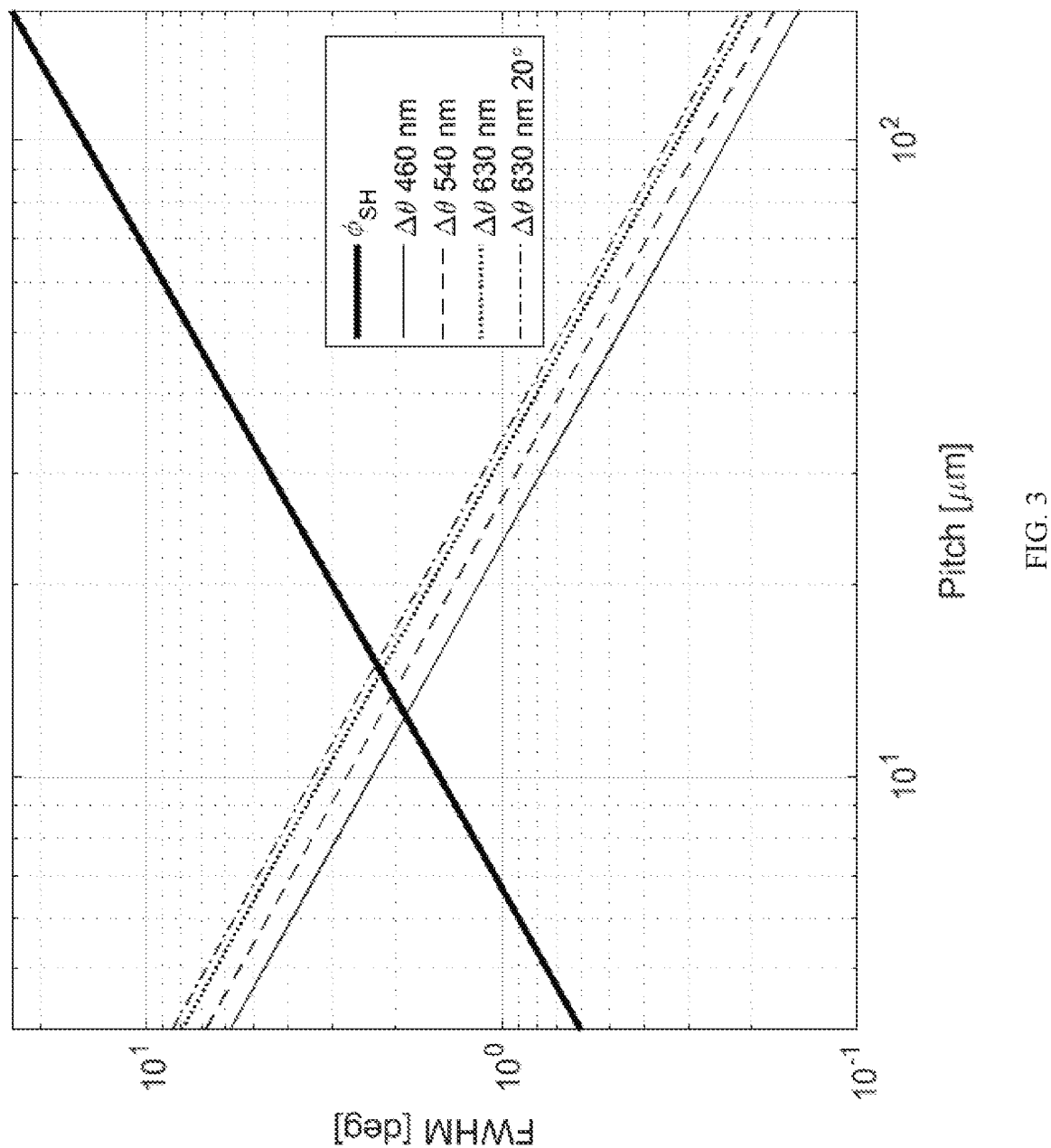
FIG. 3: illustrates a graphical representation of a full width half maximum of a sub-pixel as a function of the diffraction limited pitch.

The pitch of the sub-hogel metalens, $\Delta x_{SH}$ is given by:

$$\Delta x_{SH} = N_{SH} \Delta x_{SP}$$

where $N_{SH}$ is the number of sub-pixels per sub-hogel and $\Delta x_{SP}$ is the sub-pixel pitch. The required angular pitch of each sub-hogel, $\phi_{SH}$ is given by:

$$\phi_{SH} = \Phi * (N_{SH} - 1) + PS$$

where PS is the FWHM of the point spread function and $\Phi$ is the angular resolution of the display. It has been found that having the FHWM of the PS equal to twice the angular resolution provides a comfortable viewing experience Using the above equations, it is possible to determine the minimum number of sub-pixels per sub-hogel to overcome the diffraction limit, $\Delta\theta$. $\phi_{SH}$ and $\Delta\theta$ are plotted against $\Delta x_{SH}$ in FIG. 3 in a graphical representation of FWHM [deg] versus pitch [µm] for an angular resolution of 0.6 degrees and a PS of 1.2 degrees. The diffraction limit is met for a sub-hogel containing 4×4 or more sub-pixels (based on a 4 µm×4 µm sub-pixel).

Figure 4:
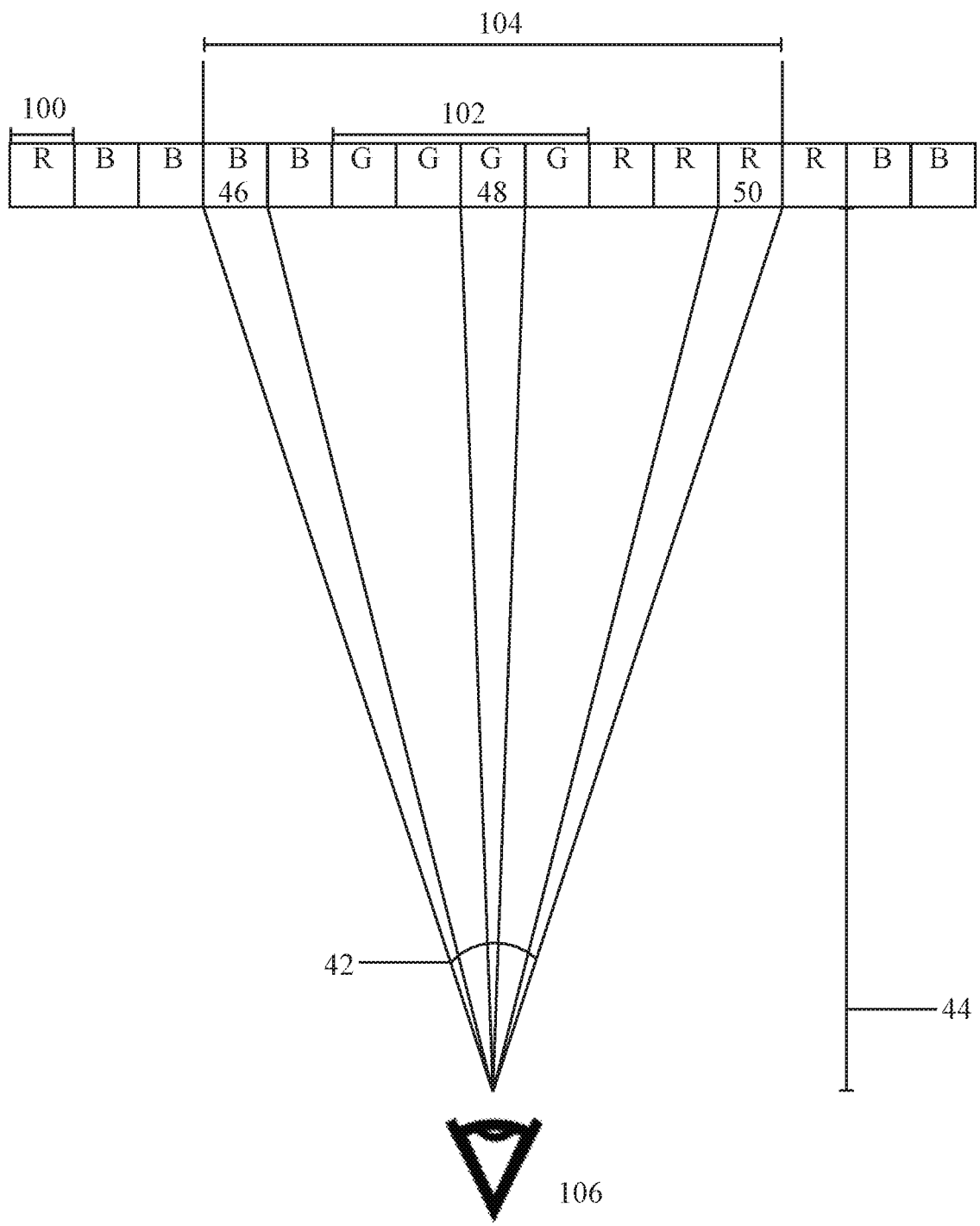
FIG. 4: illustrates a cross-sectional view along the y-axis of a 4×4 sub-hogel array.

The upper limit on the number of sub-pixels per sub-hogel is set by the eye's ability to discern the individual sub-pixels as larger sub-hogels increase the distance between the RGB sub-pixels that combine to form each individual pixel. FIG. 4 represents a cross-sectional view along the y-axis of a sub-hogel array with four sub-pixels per sub-hogel, highlighting three sub-pixels: a blue (B) sub-pixel 46, a green (G) sub-pixel 48, and a red (R) sub-pixel 50, in adjacent sub-hogels that contribute to a single pixel observed at a distance d normal to the screen 44. FIG. 4 illustrates the subtended angle of a single pixel when viewed by an observer 106, centered on the central sub-pixel, as related to the sub-pixel pitch 100 ($\Delta x_{SP}$) and the sub-hogel pitch 102 ($\Delta x_{SH}$). The sub-pixels extend into they dimension with a pitch of ($\Delta y_{SP}$). In this example all RGB triplets of sub-pixels that form each pixel lie in the same row of sub-pixels, such that only $\Delta y_{SP}$ contributes to the size of a pixel in the y dimension.

The angular spread of a RGB sub-pixel is maximized for a viewer normal to the screen; therefore, this view will limit the sub-hogel size. The light that forms each pixel is spread over a viewing distance 104 given by:

$$d_{pix} = \sqrt{(2\Delta x_{SH} + \Delta x_{SP})^2 + (\Delta y_{SP})^2}$$

Given that the angular resolution 42 of the human eye is limited to $\beta = 0.03°$, the minimum viewing distance of the pixel is:

$$d_{min} = \frac{2\Delta x_{SH} + \Delta x_{SP}}{2 \tan\left(\frac{\beta}{2}\right)} \approx \frac{2\Delta x_{SH} + \Delta x_{SP}}{\beta}$$

$$d_{min} = \frac{\sqrt{(2\Delta x_{SH} + \Delta x_{SP})^2 + (\Delta y_{SP})^2}}{2 \tan\left(\frac{\beta}{2}\right)} \approx \frac{\sqrt{(2\Delta x_{SH} + \Delta x_{SP})^2 + (\Delta y_{SP})^2}}{\beta}$$

For a given minimum viewing distance, the above equation can be used to set the maximum sub-hogel size. The minimum viewing distance can be set by the near point of the human eye or by the characteristics of the light field display:

$$d_{min} = \frac{W_{display}}{2 \tan\left(\frac{FOV}{2}\right)}$$

The maximum sub-hogel pitch is found by solving the above quadratic equation. For the case where $(2\Delta x_{SH} + \Delta x_{SP})^2 \gg \Delta y_{SP}$, the maximum sub-hogel pitch can be approximated by:

$$\Delta x_{SHmax} = \frac{d_{min}\beta - \Delta x_{SP}}{2}$$

Figure 5:
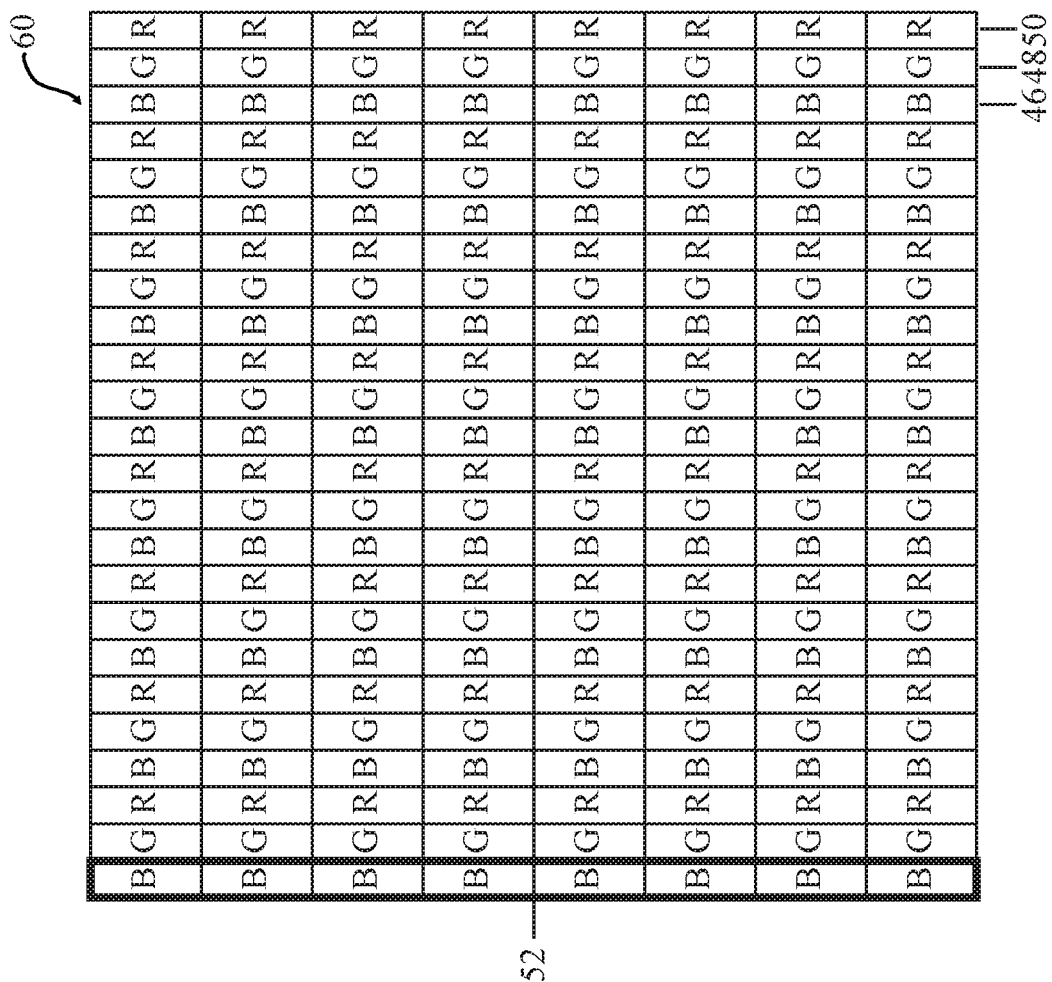
FIG. 5: illustrates an embodiment of the present disclosure depicting an 8×8 array of sub-hogels.

FIG. 5 illustrates an embodiment of the present disclosure depicting a hogel 60 comprising an array of 8×24 multicoloured sub-hogels 52 for a total of 192 sub-hogels. The hogel shown has 64×64 views in full colour from the array of blue sub-pixels 46, green sub-pixels 48, and red sub-pixels 50.

Figure 6:
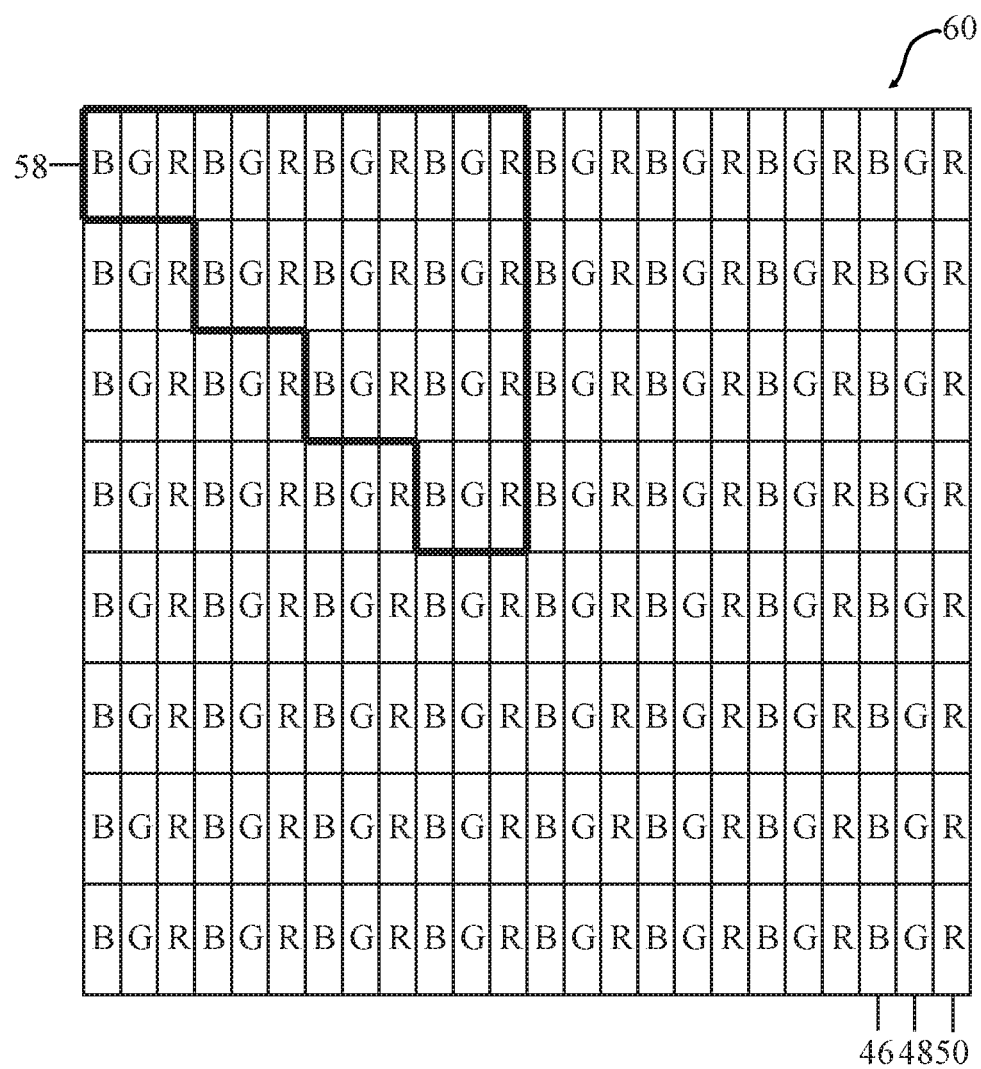
FIG. 6: illustrates reducing the number of metalenses required if 8-fold symmetry is applied to an 8×8 array of sub-hogels.

FIG. 6 illustrates a hogel 60 comprising a plurality of sub-pixels which reduces the number of metalenses required if 8-fold symmetry is applied to an 8×8 array of sub-hogels. As shown in FIG. 6, due to the symmetry of the views, the number of unique meta-lenses 58 is reduced from 192 to 48 for four-fold symmetry and the number of unique meta-lenses 58 further reduces to 30 if eight-fold symmetry is applied. The number of unique meta-lenses for this example would be one for each individual RGB sub-pixel. For larger screens, where the minimum viewing distance is greater a 16×16 array of sub-pixels 46, 48, 50 per sub-hogel can be used, reducing the number of sub-hogels to 48, applying four-fold symmetry reduces the number unique meta-lenses to 12. It then follows that applying eight-fold symmetry reduces that number to 9.

The integral image for a sub-hogel display is formed by subdividing the elemental image of a hogel display into equally sized partial-elemental images with an integer number of pixels for each partial-elemental image. An elemental image represents a two dimensional (2D) image, $LF(x_f, y_f, u, v)$, for a fixed $x_f, y_f$ $LF(x_f, y_f, u, v)$ for a light field display. The elemental image is a directional image of the light field from the fixed $x_f, y_f$ position. Each partial-elemental image is then decomposed into three sub-partial-elemental images one for each colour channel, such that each pixel of the partial-elemental image has a corresponding sub-pixel in each one of the sub-partial-integral images. The sub-partial-elemental images are placed adjacent to each other to create an elemental image of a sub-hogel display.

Figure 7:
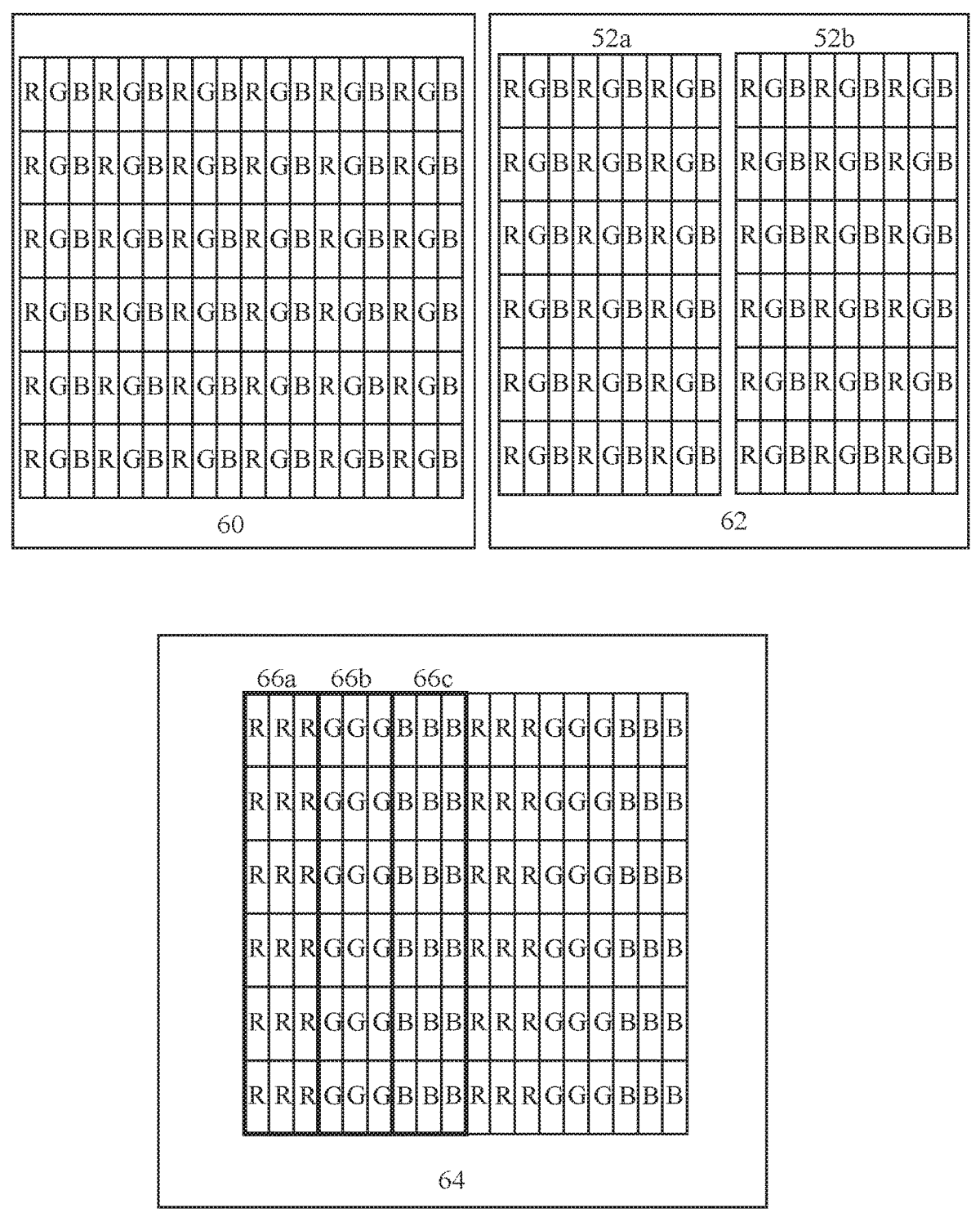

FIG. 7 shows the transformation of an 6×6 hogel 60 into a partitioned hogel 62. As shown, partitioned hogel 62 is divided into two multicoloured sub-hogels 52a, and 52b, in the x-direction, however it is understood that the partitioning could be done in a variety of orientations. In hogel 60, which can also be referred to as an elemental image, and partitioned hogel 62, which can also be referred to as a partial elemental image, there are 6×6 pixels, each pixel comprising one red sub-pixel, one blue sub-pixel, and one green sub-pixel. Each sub-pixel is preferably less than 10 μm² in size. FIG. 7 further illustrates the transformation of the 6×6 partitioned hogel 62 into sub-hogel elemental image 64. It should be noted that the division of the elemental image into partial-elemental images need only occur along one direction as like-coloured sub-pixels are already adjacent to each other along the remaining axis, however, it is again understood that the partitioning could be done in a variety of orientations. The resulting sub-hogel elemental image 64 is composed of monochromatic sub-hogels 66a, 66b, and 66c. The pixels in monochromatic sub-hogels 66a, 66b, and 66c are shown arrayed in a rectangular 3×6 configuration, however it is understood that sub-hogels can be configured in orientations, such as, for example, in other rectangular orientations, square orientations, or radial orientations, with varying numbers of sub-pixels in each sub-hogel.

The initial hogel elemental image data is stored in an 6×6 matrix whereas the sub-hogel elemental image data is stored in a 18×6 matrix. A MatLab (or equivalent) script may be used to convert a hogel integral image into a sub-hogel integral image, which may be written to a .txt file. To display a light field, the whole image for display is generally called the integral image, and the integral image is divided up into a plurality of elemental images, where the image is sent to a light field display for displaying the image. Each elemental image is displayed by an associated hogel within a hogel array and is comprised of a plurality of hogels arranged in a hogel array. Each pixel in an elemental image has a corresponding view or direction such that a viewer facing the display at a normal to the display will see the pixel at the centre of each hogel in the hogel array.

A sub-hogel display architecture was simulated with a ray tracing software, to analyze how the display will be perceived. It should be noted these simulations can be performed by any suitable software tool. One example of a ray tracing software tool is FRED. As previously described, FRED refers to Fred Optical Engineering Software (FRED) is a commercial 3D CAD computer program for optical engineering used to simulate the propagation of light through optical systems. It should be noted that a limited number of views were simulated to simplify the simulation.

Figure 8:
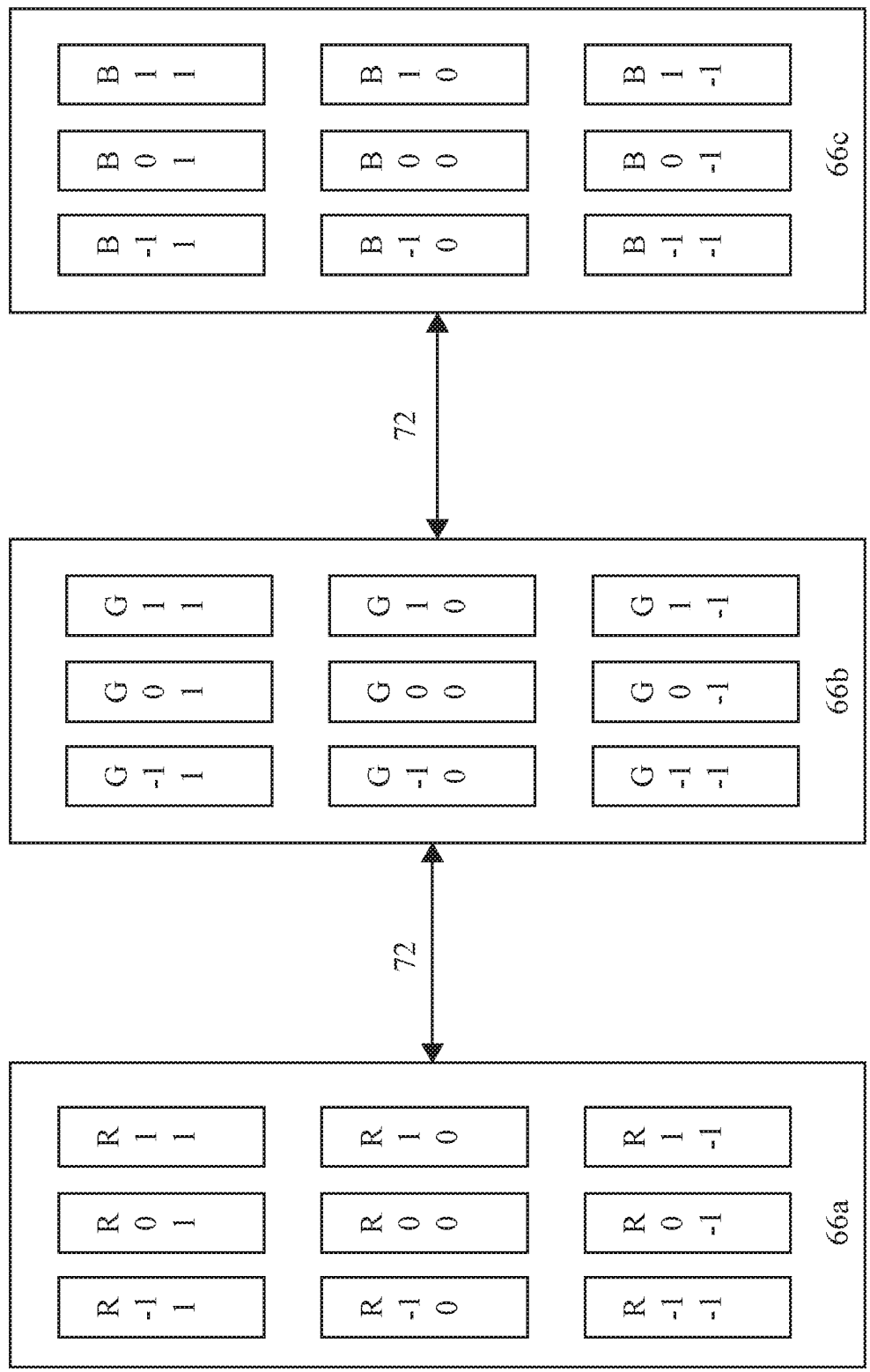
FIG. 8: illustrates a simulated light field display further zoomed in on a set of three (RGB) sub-hogels.

FIG. 8 shows a simulated light field display further zoomed in on a set of three monochromatic (RGB) sub-hogels, specifically a red monochromatic sub-hogel 66a, a green monochromatic sub-hogel 66b, and a blue monochromatic sub-hogel 66c. To conserve computational resources, nine views were simulated in ray tracing software. The test image is a 4×8 pixel white image, in order to test colour blending. Each monochromatic (RGB) sub-hogel 66a, 66b, and 66c, creates one pixel for 3×3 views. The space between sub-hogels 72 is reserved for additional views. Each monochromatic sub-hogel can be comprised of a plurality of sub-pixels, and preferably has between 2 and 144 monochromatic sub-pixels.

In these simulations, a single wavelength acts as the source. The colour mixing ratio required to mix white was determined using a mixing ratio calculator. The ratio provided by the calculator are luminance ratios, which is a photometric quantity; therefore, the power ratio for the source was set to the luminance ratio divided by photopic luminosity function, which is a built-in photopic function in the ray-tracing software tool To analyze the perception of the sub-hogel display a model of the human eye, also referred to as the "Arizona eye", created by Photon Engineering, was incorporated into the model. The pupil diameter and accommodation of the eye can be set by the user. Accommodation can be defined as the process by which the vertebrate eye changes optical power to maintain a clear image or focus on an object as its distance varies. An analysis surface is placed at the back of the retina to capture the observed image. The sampling of distance of the retina should be 8 microns as 1 degree of vision corresponds to a length of 288 microns on the retinal and the eye can resolve lines separated by as little as 0.03 degrees.

Results

Figure 9A:
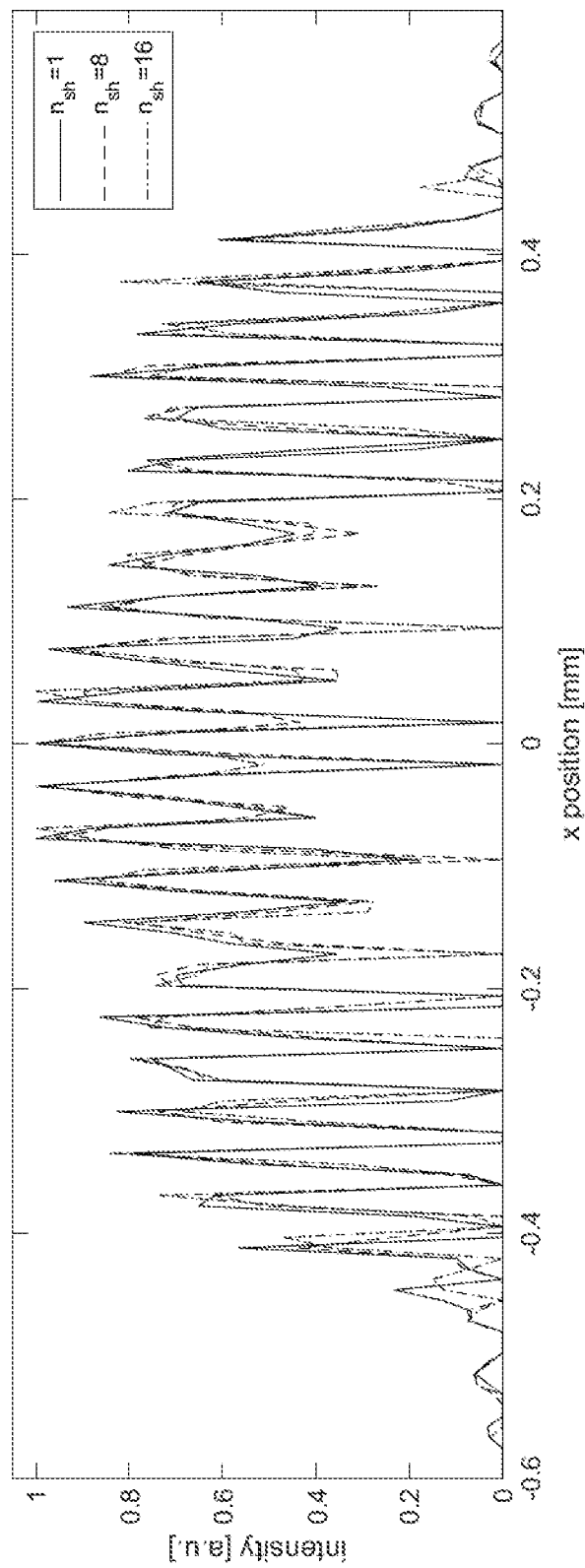
FIG. 9A: illustrates a graphical representation of the intensity of a red colour channel of the captured retinal image for $n_{sh}$ (sub-pixels per sub-hogel)=8,16 compared to that of the ideal $n_{sh}=1$.
Figure 9B:
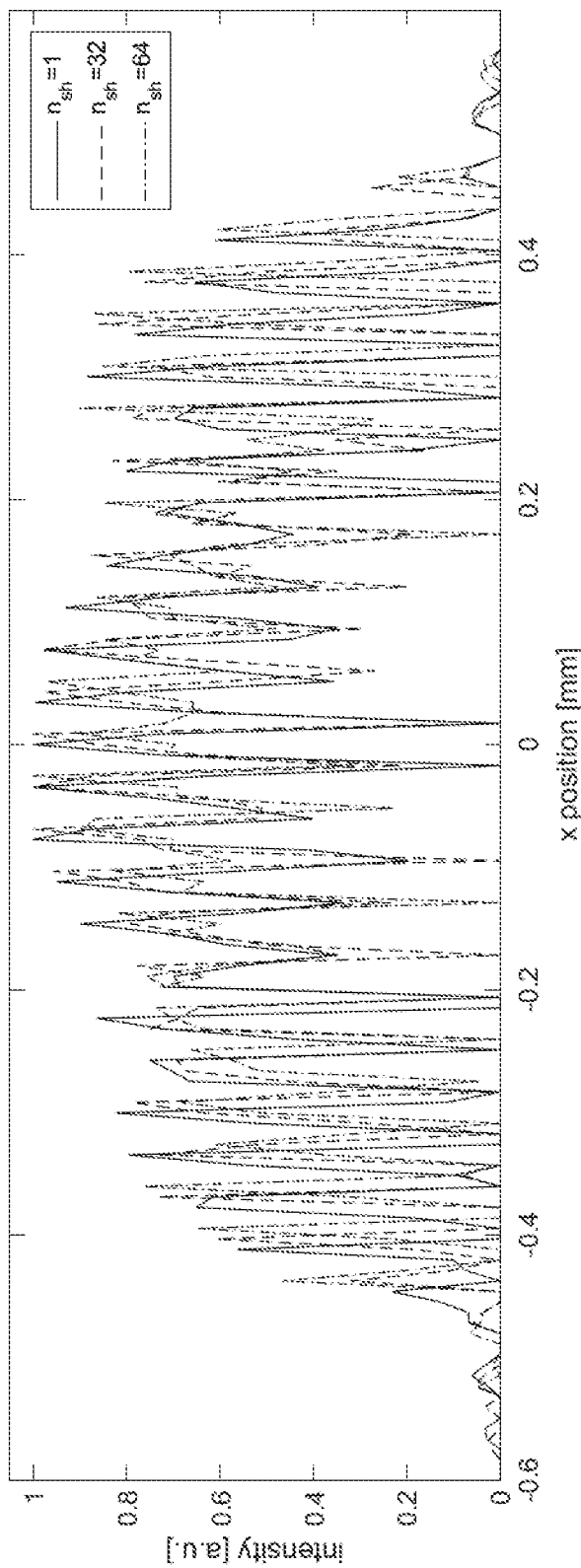
FIG. 9B: illustrates a graphical representation of the intensity and shift in pixels the intensity of a red colour channel of the captured retinal image for $n_{sh}$ (sub-pixels per sub-hogel)=32, 64.
Figure 9C:
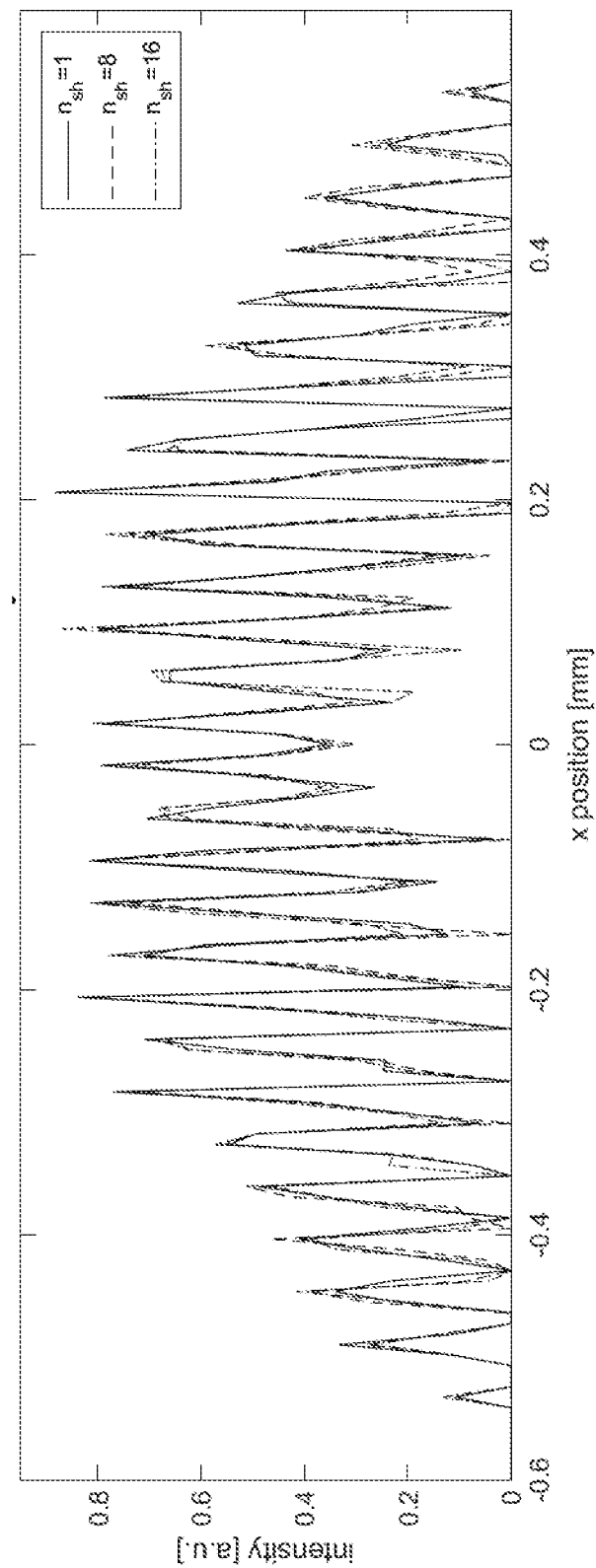
FIG. 9C: illustrates a graphical representation of the intensity of a green colour channel of the captured retinal image for $n_{sh}=8,16$ compared to that of the ideal $n_{sh}=1$.
Figure 9D:
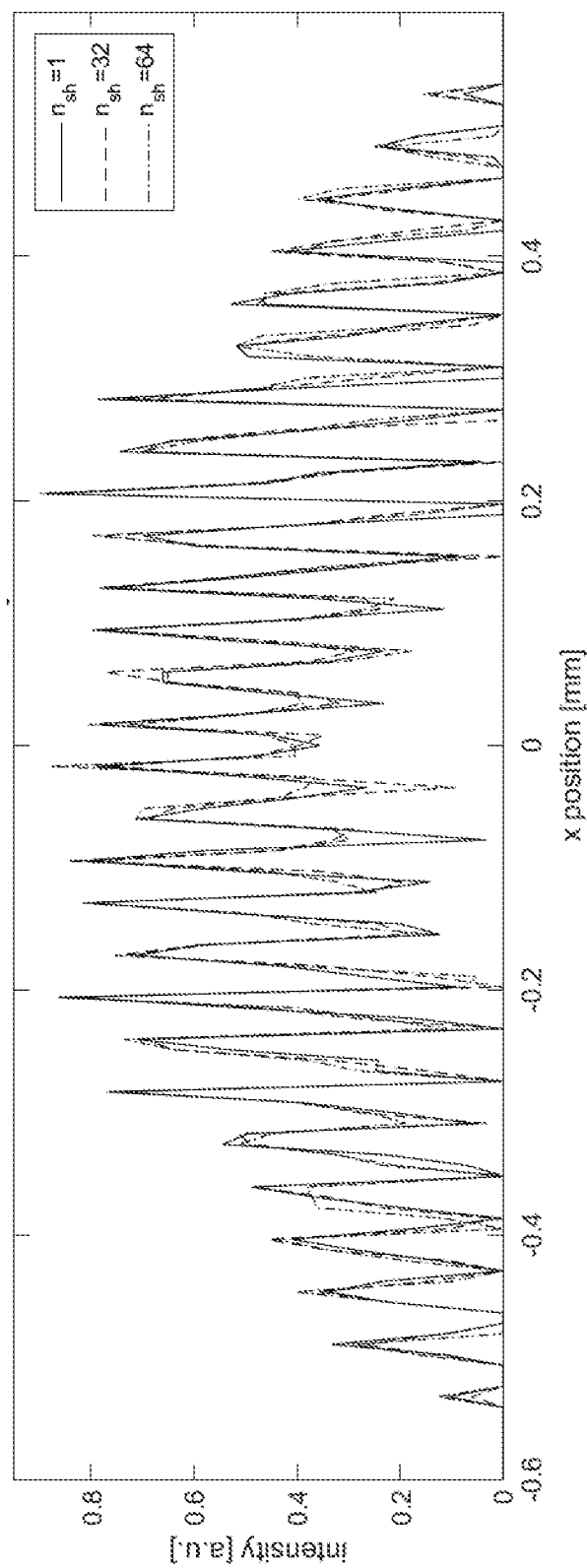
FIG. 9D: illustrates a graphical representation of the intensity and shift in pixels the intensity of a green colour channel of the captured retinal image for $n_{sh}$ (sub-pixels per sub-hogel)=32, 64.
Figure 9E:
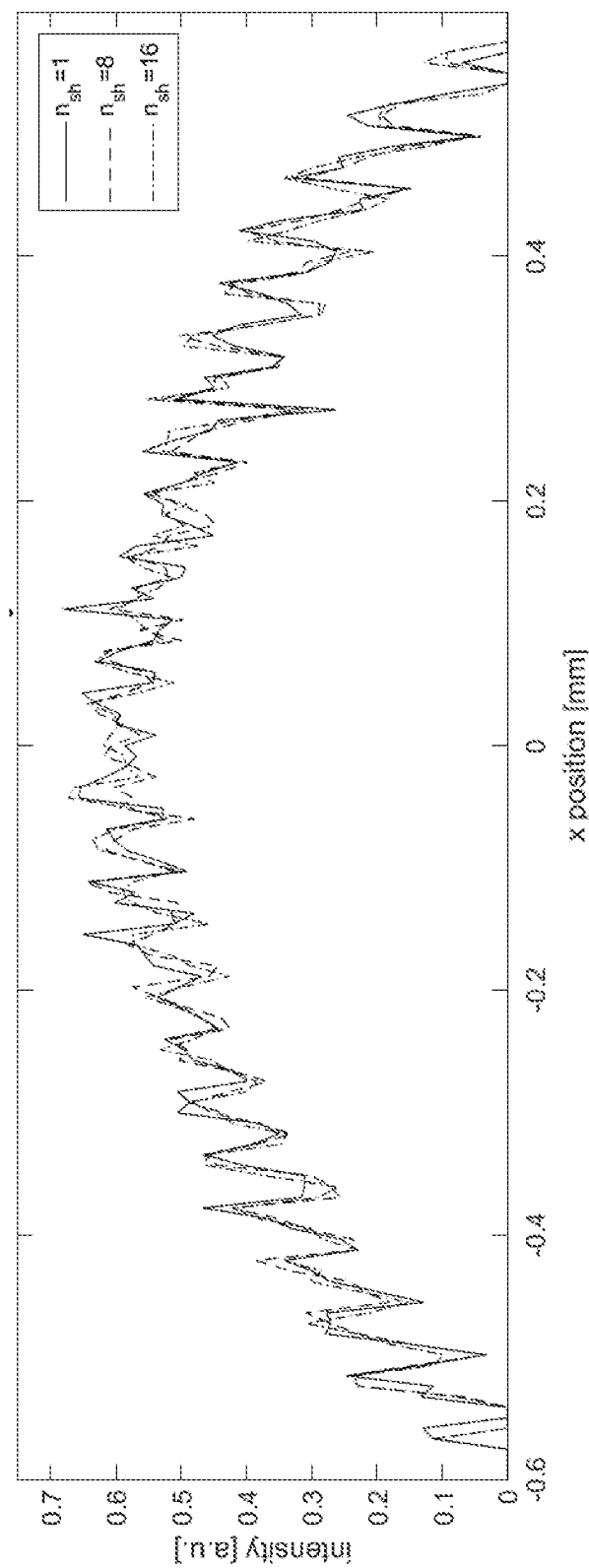
FIG. 9E: illustrates a graphical representation of the intensity of a blue colour channel of the captured retinal image for $n_{sh}=8,16$ compared to that of the ideal $n_{sh}=1$.
Figure 9F:
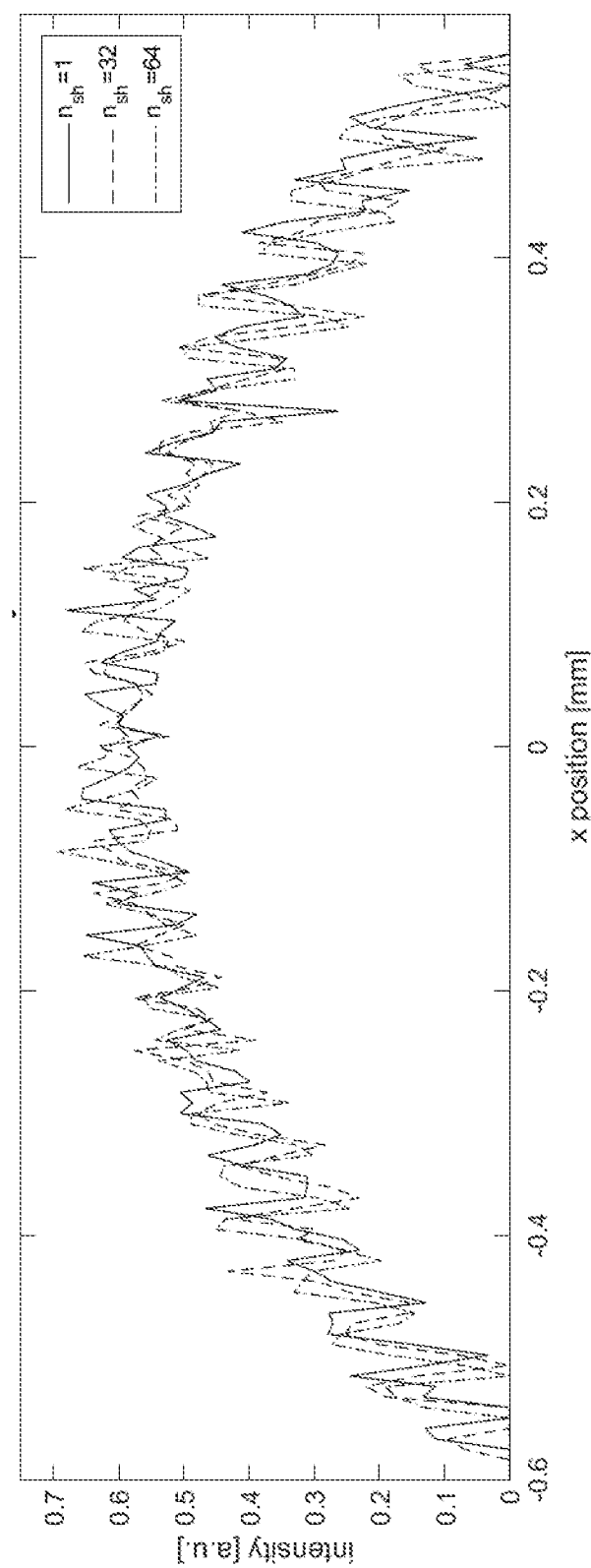
FIG. 9F: illustrates a graphical representation of the intensity and shift in pixels the intensity of a blue colour channel of the captured retinal image for $n_{sh}$ (sub-pixels per sub-hogel)=32, 64.

The resulting setup produces a series of images that are assessed qualitatively. FIGS. 9A-F illustrate the intensity of each colour channel of the captured retinal image for a varying number of sub-pixels per sub-hogel. These ray tracing simulations do not consider diffraction; therefore, the case where there a single sub-pixel per sub-hogel represents the case on an ideal metalens paired with a conventional sub-pixel array. The intensity peaks correspond to the retinal positions of the image formed by a pixel or the perceived location of the pixel in arbitrary units. For $n_{sh}$=8,16 the location of the pixels in all colour channels matches that of the ideal $n_{sh}$=1, as illustrated in FIG. 9A for red, FIG. 9C for green, and FIG. 9E for blue, where $n_{sh}$ is defined as the number of sub-pixels per sub-hogel. For $n_{sh}$=32,64 the position of the pixels in the red channel are shifted in the positive x direction with $n_{sh}$=64 having a greater shift than $n_{sh}$=32, as shown in FIG. 9B; the pixel positions in the green channel match the ideal case as illustrated in FIG. 9D; the position of the pixels in the blue channel are shifted in the negative x direction with $n_{sh}$=64 having a greater shift than $n_{sh}$=32, as illustrated in FIG. 9F. As $n_{sh}$ increases the distance between the sub-pixels of a pixel increases along the x axis, such that for a central pixel with this sub-pixel geometry the red sub-pixels are pushed positive x direction, the green sub-pixels will stay central, and the blue sub-pixels will be pushed in the negative x direction. At a large enough $n_{sh}$, a central viewer will perceive a white pixel as separate RGB pixels, in this example, $n_{sh}$=32 and 64. The sub-pixels have dimensions of $x_{SP}$=3.3 μm and $\Delta y_{SP}$=10 μm. For $n_{sh}$=16 the following equation describing the light that forms each pixel is:

$$d_{pix} = \sqrt{(2\Delta x_{SH} + \Delta x_{SP})^2 + (\Delta y_{SP})^2}$$

where $\Delta x_{SHMAX}$=63 μm, which corresponds to a maximum of 19 sub-pixels per sub-hogel, which agrees with the above result.

Example 1

An example of determining the effective index of a nanopillar for a metasurface designed for a light field display is described herein. Considering a step index guide with $n_1$=1.5, $n_2$=1.6, d=5 μm, and λ=1.55 μm:

$$V^2 = u^2 + v^2 = \left(\frac{1}{2}hd\right)^2 + \left(\frac{1}{2}qd\right)^2 = \left(\frac{\pi d}{\lambda}\right)^2 (n_2^2 - n_1^2)$$

$$V = 5.64$$

Figure 10:
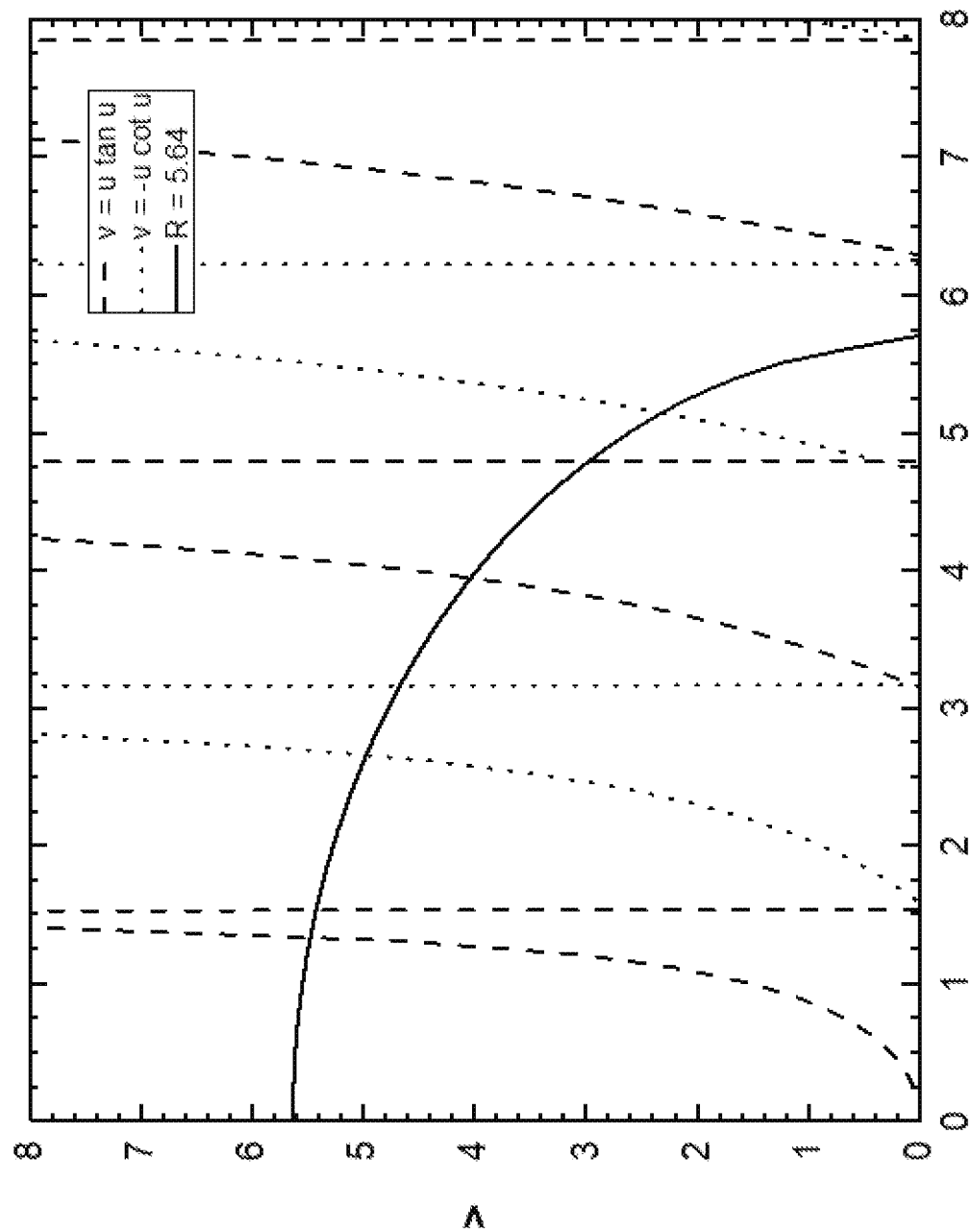
FIG. 10: is a u versus v plot illustrating the intersection points the boundary conditions and the mode condition equations above for transverse electric (TE) symmetric and asymmetric modes.

It is expected that there will be m−1=4 confined modes in the waveguide. FIG. 10 is a u versus v plot illustrating the intersection points the boundary conditions and the mode condition equations above for TE symmetric and asymmetric modes. From this figure, the u values of the intersection points are 1.33, 2.65, 3.94, and 5.14, respectively.

To determine the value of the propagation constant and the effective index, the values for the dispersion relation in a symmetrical waveguide are extracted, noting that the propagation constant is scaled from 0 to 1 using the equation:

$$b = \frac{\left(\frac{\beta}{k}\right)^2 - n_1^2}{n_2^2 - n_1^2} = \frac{n_{eff}^2 - n_1^2}{n_2^2 - n_1^2}$$

which may be written as:

$$\beta = k\sqrt{b(n_2^2 - n_1^2) + n_1^2}$$

The values for the intersection points can then be used to find the value for the propagation constants. The resulting β values are 6.46, 6.40, 6.29, and 6.15.

Figure 11:
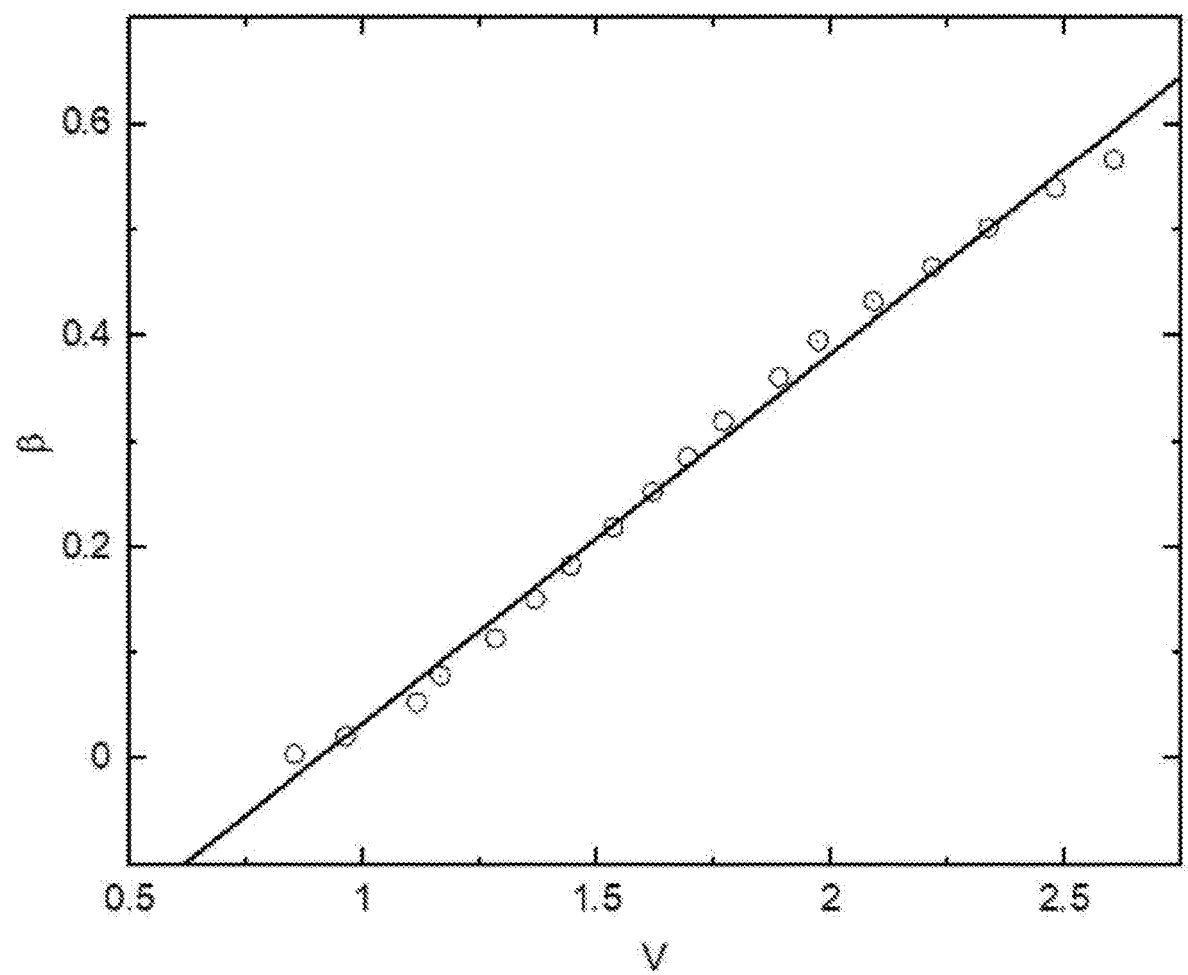
FIG. 11: illustrates a linear relationship of ß versus V in an embodiment of the present disclosure.

Noting that within this range the data is approximately linear, the relationship between b and V is illustrated in FIG. 11 can be described as:

$$b = 0.349V - 0.314$$

The relationship between the pillar diameter and the effective index may be defined as:

$$\frac{n_{eff}^2 - n_1^2}{n_2^2 - n_1^2} = 0.349\left(\frac{\pi d}{\lambda}\sqrt{n_2^2 - n_1^2}\right) - 0.314$$

To relate these variables, V is calculated from the diameter of the pillar, b and β are calculated defining the normalized propagation constant, then the effective index of each pillar can be approximated.

In general, the phase accumulation from a dielectric is defined as:

$$\Delta\phi = \frac{2\pi}{\lambda} n_{eff} H$$

However, the effective index value used in this equation assumes a constant effective index (periodic structure with same diameter and unit cell width). Since the effective index as a function of diameter is approximately linear within the single mode resonance bounds defined above, the effective index can be replaced with the effective index difference from maximum to minimum diameter:

$$\Delta n_{eff} = n_{eff}(d_{max}) - n_{eff}(d_{min})$$

Therefore, the equation for phase accumulation can be written as:

$$\Delta\phi = \frac{2\pi}{\lambda} H(n_{eff}(d_{max}) - n_{eff}(d_{min}))$$

The phase accumulation per unit length can be written as:

$$\frac{\Delta\phi}{H} = \frac{2\pi}{\lambda} \Delta n_{eff}$$

If $\Delta\phi$=2π, the minimum height required to achieve a 2π phase shift within the resonance bounds can be found using:

$$H = \frac{\lambda}{\Delta n_{eff}}$$

Table 1 below calculates the phase accumulation and minimum height required for each wavelength.

TABLE 1

Phase Accumulation and Minimum Height Required for Each Wavelength

| Wavelength [nm] | Phase Accumulation [rad/nm] | Minimum Height [nm] |
|---|---|---|
| 460 | 0.0134 | 467 |
| 540 | 0.0107 | 584 |
| 630 | 0.0088 | 712 |

Figure 12:
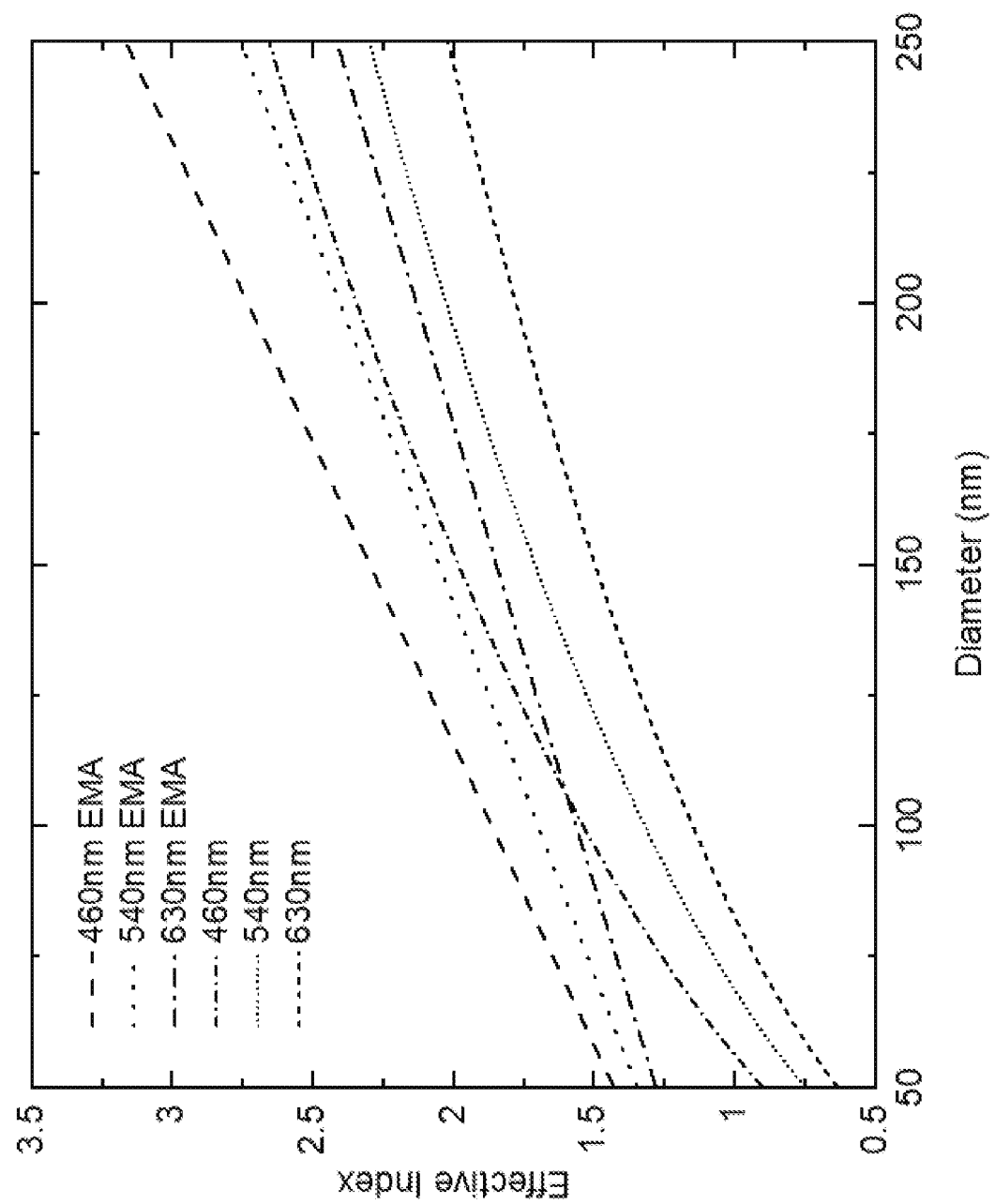
FIG. 12: illustrates a comparison of the calculated effective medium calculated with an approximation of the effective index based on the weighted index of a pillar and air gap in an embodiment of the present disclosure.

FIG. 12 compares the calculated effective medium calculated here with an approximation of the effective index based on the weighted index of the nanopillar and the air gap. The plot shows that this effective medium approximation (EMA) overestimates the index. Further calculation also finds that in the defined range of diameters for each wavelength, the total phase accumulation is lower.

Example 2

An implementation of a monochromatic sub-hogel design for use as an achromatic metasurface for a high-definition light field display is provided as described. To determine an appropriate sub-hogel size for a minimum light field display screen size of 3.15" with a field of view (FOV) of 40°, given the angular resolution of the human eye is limited to $\beta=0.03°$, the minimum viewing distance of the display is:

$$d_{min} = \frac{2\Delta x_{SH} + \Delta x_{SP}}{2\tan\left(\frac{\beta}{2}\right)} \approx \frac{2\Delta x_{SH} + \Delta x_{SP}}{\beta} = 0.069 \text{ m}$$

The minimum viewing distance is:

$$d_{minDisplay} = \frac{W_{Display}}{\tan\left(\frac{FOV}{2}\right)} = \frac{0.0788 \text{ m}}{\tan(20°)} = 0.21 \text{ m}$$

As the near point of the human eye, $d_{np}$ (nearest point that the eye can focus ~25 cm) is greater than the minimum viewing distance of the display, this used to determine the maximum sub-hogel pitch using the following relation:

$$\Delta x_{SHmax} = \frac{d_{np}\beta - \Delta x_{SP}}{2} = 63 \text{ μm}$$

It is therefore determined that a viewer would just be able to discern individual sub-pixels for a 16×16 sub-hogel at the near point, assuming a 4 μm×4 μm sub-pixel. An 8×8 sub-hogel would satisfy the angular resolution of the eye at the near point and at the smaller minimum viewing distance of the described embodiment of a light field display.

Example 3

Herein is described a detailed sub-hogel size calculation for a light field display. The lower bound of the sub-hogel size is set by the diffraction limit and Rayleigh Criterion. The selection of the sub-hogel size is not trivial: the size must be large enough to meet the Rayleigh Criterion and Diffraction limit while being small enough such that the individual sub-pixels are indistinguishable at the smallest viewing distance, which is either the near point of the eye or the minimal viewing distance of the display. The Diffraction limit is given by:

$$\Delta\theta = \frac{2.89\lambda}{\pi\Delta x \cos\cos\phi_{out}}$$

where $\Delta\theta$ is the sub-hogel angular pitch, $\lambda$ is the source wavelength, $\Delta x$ is the sub-hogel pitch, and $\phi_{out}$ is the deflection angle. For the case where $PS=2\Phi_{pitch}$, the equation for the angular pitch of a sub-hogel from [00106] becomes:

$$\Delta\theta = (n_{sh}+2)\Phi_{pitch}$$

where $n_{sh}$ is the number of sub-pixels per sub-hogel along each direction (x and y) and $\Phi_{pitch}$h is the angular pitch of each view. The sub-hogel pitch should chosen such that:

$$\Delta x_{sh} \geq \frac{2.89\lambda}{\pi(n_{sh}+2)\Phi_{pitch}\cos\cos\frac{FOV}{2}}$$

The Rayleigh criterion for resolving two points through an aperture of diameter d (assuming a plane wave of light) is given by:

$$\Delta\phi \geq \frac{1.22\lambda}{d\cos\cos\phi_{out}}$$

where $\phi$ is the minimum angle between two distinguishable points; therefore:

$$\Delta x_{sh} \geq \frac{0.61\lambda}{\Phi_{pitch}\cos\cos\frac{FOV}{2}}$$

By taking the ratio of two limits it is found that the Rayleigh criterion is dominant in setting the minimum sub-hogel pitch. The value of $n_{sh}$ indicates the number of rows and columns of the sub-pixel array within the sub-hogel. For example, $n_{sh}=8$ corresponds to a sub-hogel with an 8×8 sub-pixel array. In this example FIG. 12 shows the sub-pixel geometry for $n_{sh}=4$. For the sub-pixel geometry set out in FIG. 12, Table 2 shows for $n_{sh}>8$, the Rayleigh Criterion is satisfied. It is convenient to limit the number of sub-pixels per sub-hogel to factors of 64 for a 64×64 view display corresponding to 64×64 pixels per hogel.

TABLE 2

Minimum sub-hogel dimension (microns)

| Wavelength (nm) | Rayleigh Criterion | $n_{sh} = 4$ | $n_{sh} = 8$ | $n_{sh} = 16$ | $n_{sh} = 32$ | $n_{sh} = 64$ |
|---|---|---|---|---|---|---|
| R-635 | 37.7 | 20.0 | 40.0 | 80.0 | 160.0 | 320.0 |
| G-510 | 30.3 | 16.4 | 32.8 | 65.6 | 131.2 | 262.4 |
| B-455 | 27.0 | 20.0 | 40.0 | 80.0 | 160.0 | 320.0 |

The smallest resolvable circle that lies in the plane of the display has a diameter $d_{pixMAX}$ given by:

$$d_{pixMAX} = d_{min} \tan\tan\beta \approx d_{min}\beta$$

where $d_{min}$ is the minimum viewing distance of the display and $\beta=0.03°$, which is the angular resolution of the eye. In order for humans to perceive the intended pixel colour, and not the individual sub-pixels, the sub-pixels that compose a pixel must fall with a circle of diameter $d_{pixMAX}$. At the near point of the eye (25 cm):

$$d_{pixMAX} = 131 \text{ μm}$$

Figure 13:
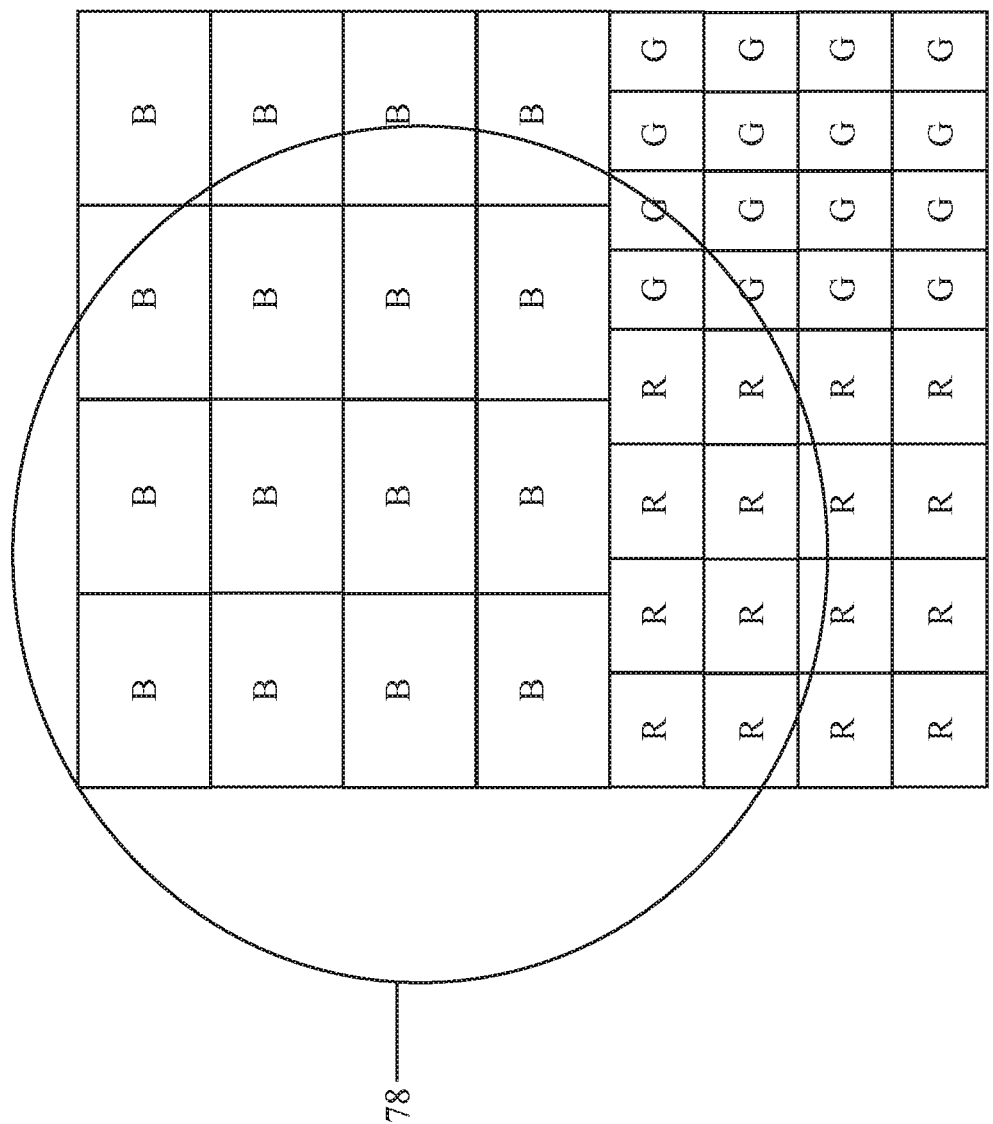
FIG. 13: illustrates the smallest circle that encompasses the upper most left sub-pixel of the R, G, and B sub-hogels in an embodiment of the present disclosure.
Figure 14:
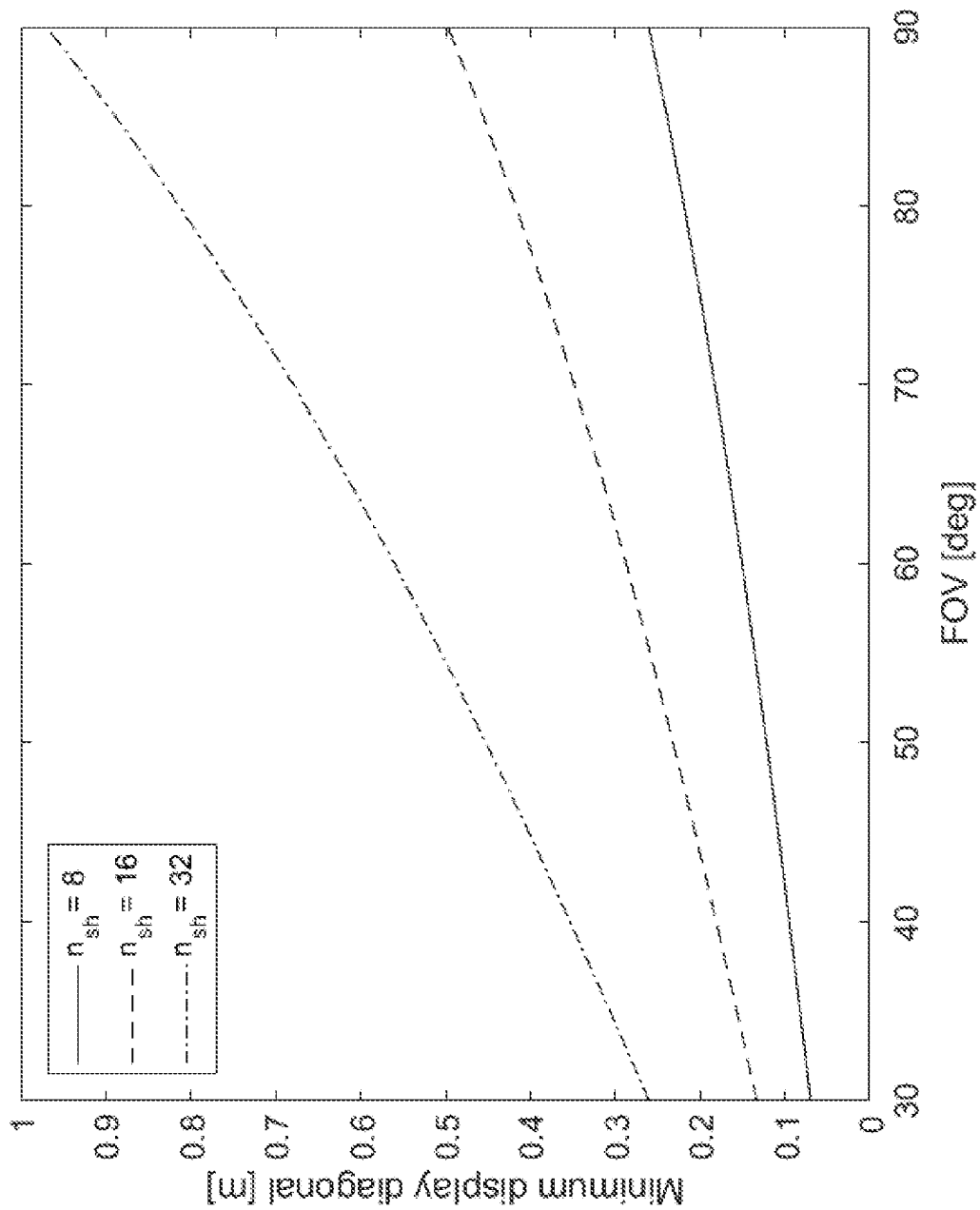
FIG. 14: illustrates a graphical plot of the minimum display diagonal versus field of view for different sub-hogel sizes.

FIG. 13 illustrates the smallest diameter 78 that encompasses the upper most left sub-pixel of the R, G, and B sub-hogels. These three sub-pixels compose one pixel. The diameter is given by:

$$d_{pix} = \sqrt{(\Delta y_{Bsh} + \Delta y_{Gsp})^2 + (\Delta x_{Rsh} + \Delta x_{Gsp})^2}$$
$$= \sqrt{(n_{sh}\Delta y_{Bsh} + \Delta y_{Gsp})^2 + (n_{sh}\Delta x_{Rsh} + \Delta x_{Gsp})^2}$$

where $\Delta x_{*sh}(\Delta y_{*sh})$ is the sub-hogel pitch in the X (Y) direction of the R, G, or B sub-hogel, $\Delta x_{*sp}(\Delta y_{*sp})$ is the sub-pixel pitch in the X (Y) direction of the R, G, or B sub-pixel. By setting $d_{pix}=d_{pixMAX}$ and requiring $n_{sh}$ to be a positive real number, the maximum number of sub-pixels per sub-hogel is found to be 16 for a minimum viewing distance of 25 cm (near point of the human eye). However, the minimum viewing distance for many displays is larger than the human near point and is given by:

$$D_{min} = \frac{W_{disp}}{2\tan\tan\frac{FOV}{2}}$$

where $W_{disp}$ is the display diagonal and FOV is the field of view. FIG. 14 plots the minimum display diagonal versus FOV for different sub-hogel sizes.

Figure 15:
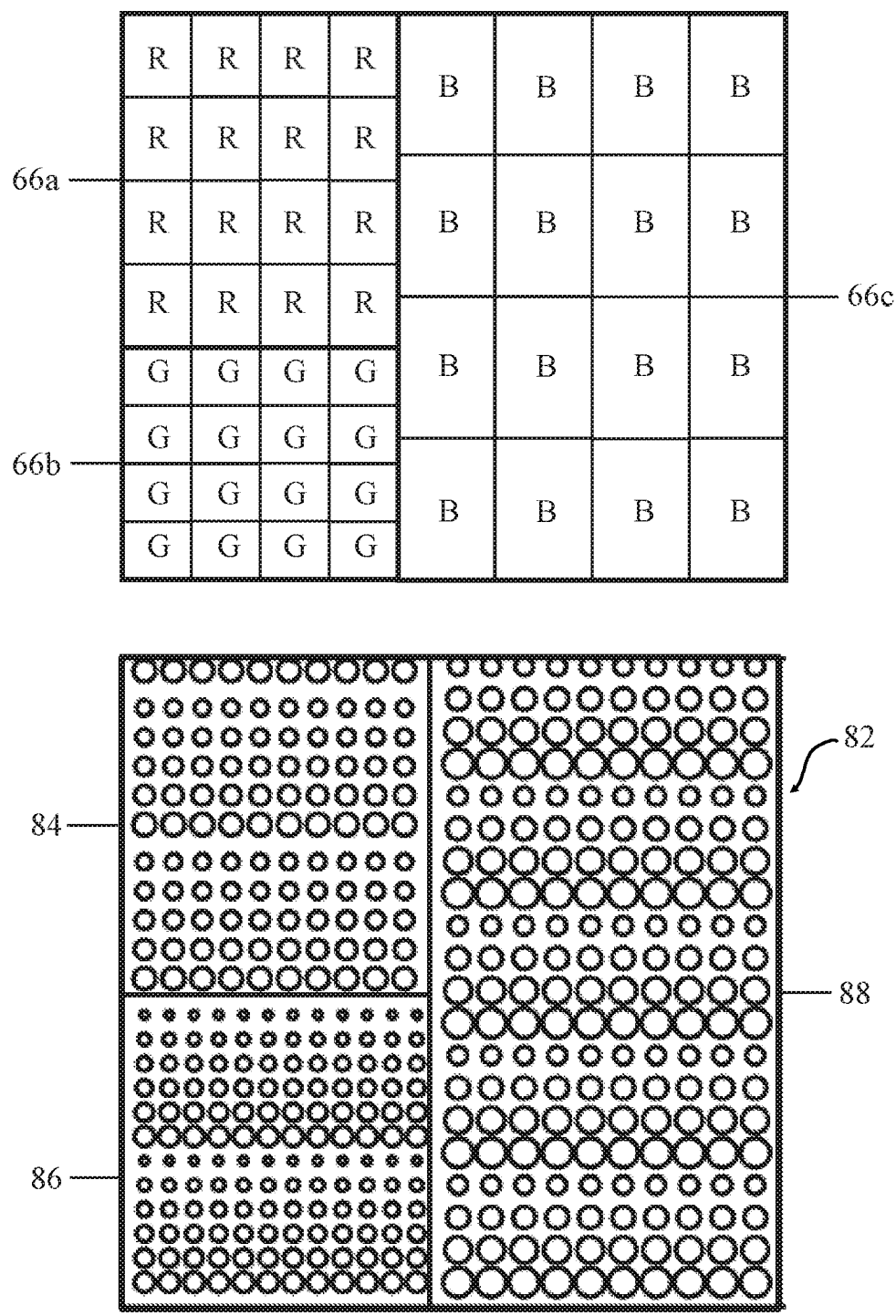
FIG. 15: illustrates a triplet of monochromatic sub-hogels to form three colour regions and a metasurface designed for each colour region.

FIG. 15 illustrates a triplet of three monochromatic sub-hogels 66a, 66b, and 66c. Each monochromatic sub-hogel 66a, 66b, and 66c, is comprised of 4×4 sub-pixels of a single colour. Due to the clustering of the like-coloured sub-pixels, a metasurface 82 can be designed with specific properties tailored for each colour region. An advantage of this configuration is that the metasurface 82, which acts as the directional optical element, can be designed to have properties specific for a particular wavelength of light, or colour. Forming colour regions in the metasurface 82 which are larger than a single sub-pixel allows for a metasurface design that can be practically manufactured. The metasurface colour region for red 84 is aligned directly on top of the red sub-hogel 66a. The metasurface colour region for green 86 is aligned directly on top of the green sub-hogel 66b, and similarly, the metasurface colour region for blue 88 is aligned directly on top of the blue sub-hogel 66c.

Figure 16A:
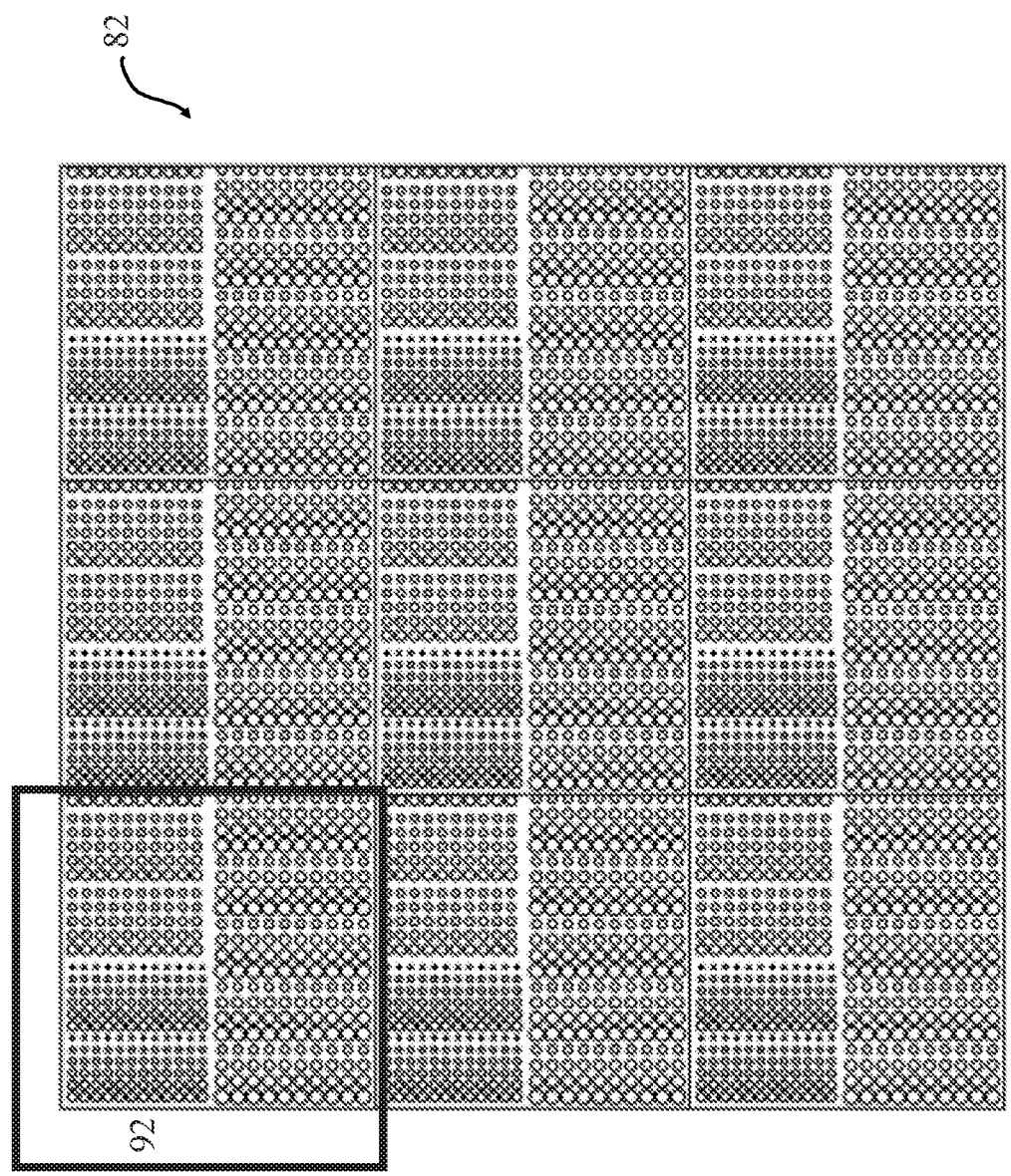
FIG. 16A: illustrates a plan view of a metasurface design for a 3×3 three-sub-hogel array arrangement in an embodiment of the present disclosure.

FIG. 16A illustrates a plan view of a metasurface 82 design as per an embodiment of the present disclosure designed for a 3×3 array of three monochromatic sub-hogels, using the disclosed metasurface design method as per FIG. 1.

Figure 16B:
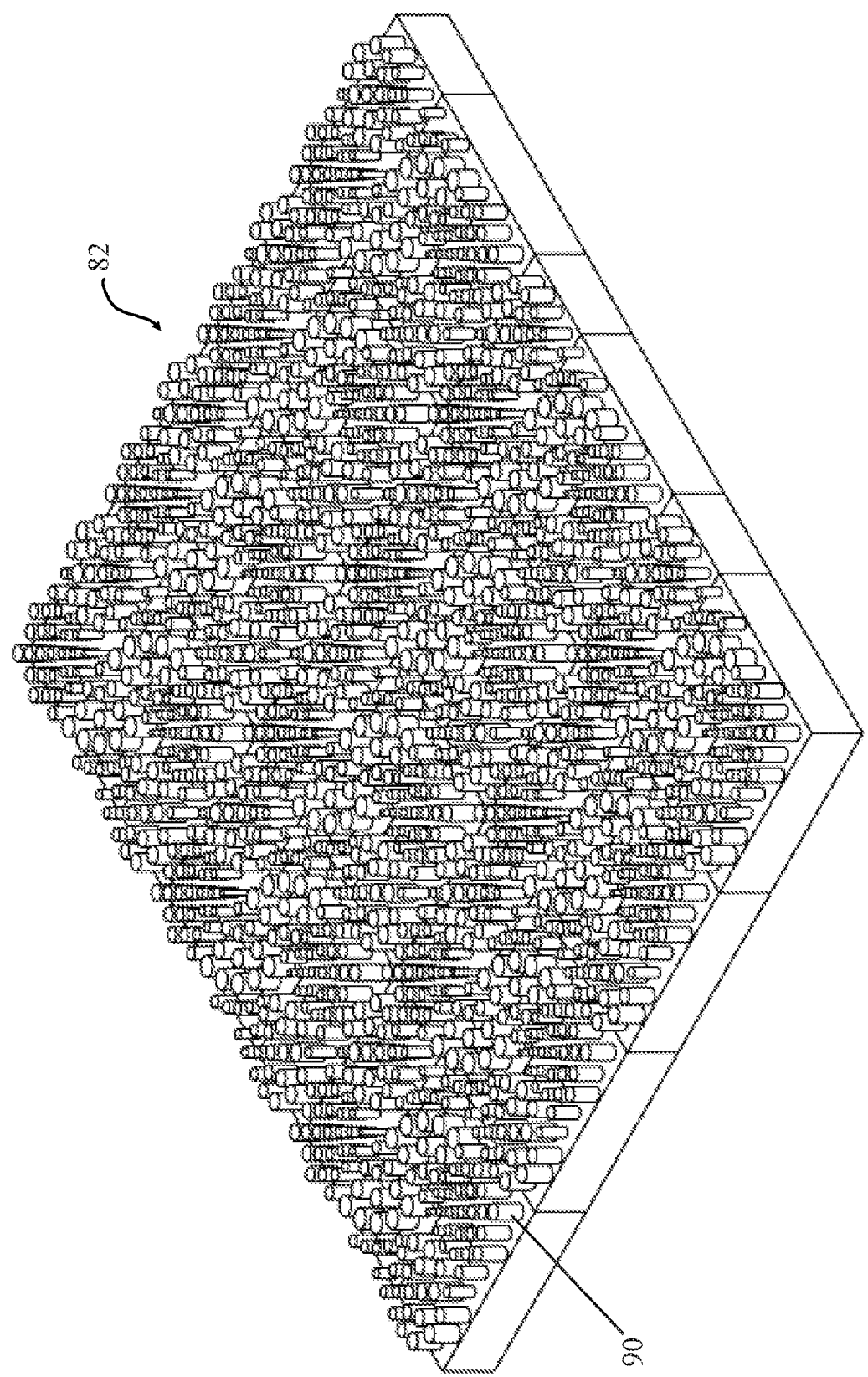
FIG. 16B: illustrates an isometric view of a metasurface design for a 3×3 three-sub-hogel array arrangement in an embodiment of the present disclosure.

FIG. 16B illustrates an isometric view of said metasurface 82 design as per an embodiment of the present disclosure comprising a 3×3 array of three sub-hogels, designed using the disclosed metasurface design method as per FIG. 1.

Figure 17A:
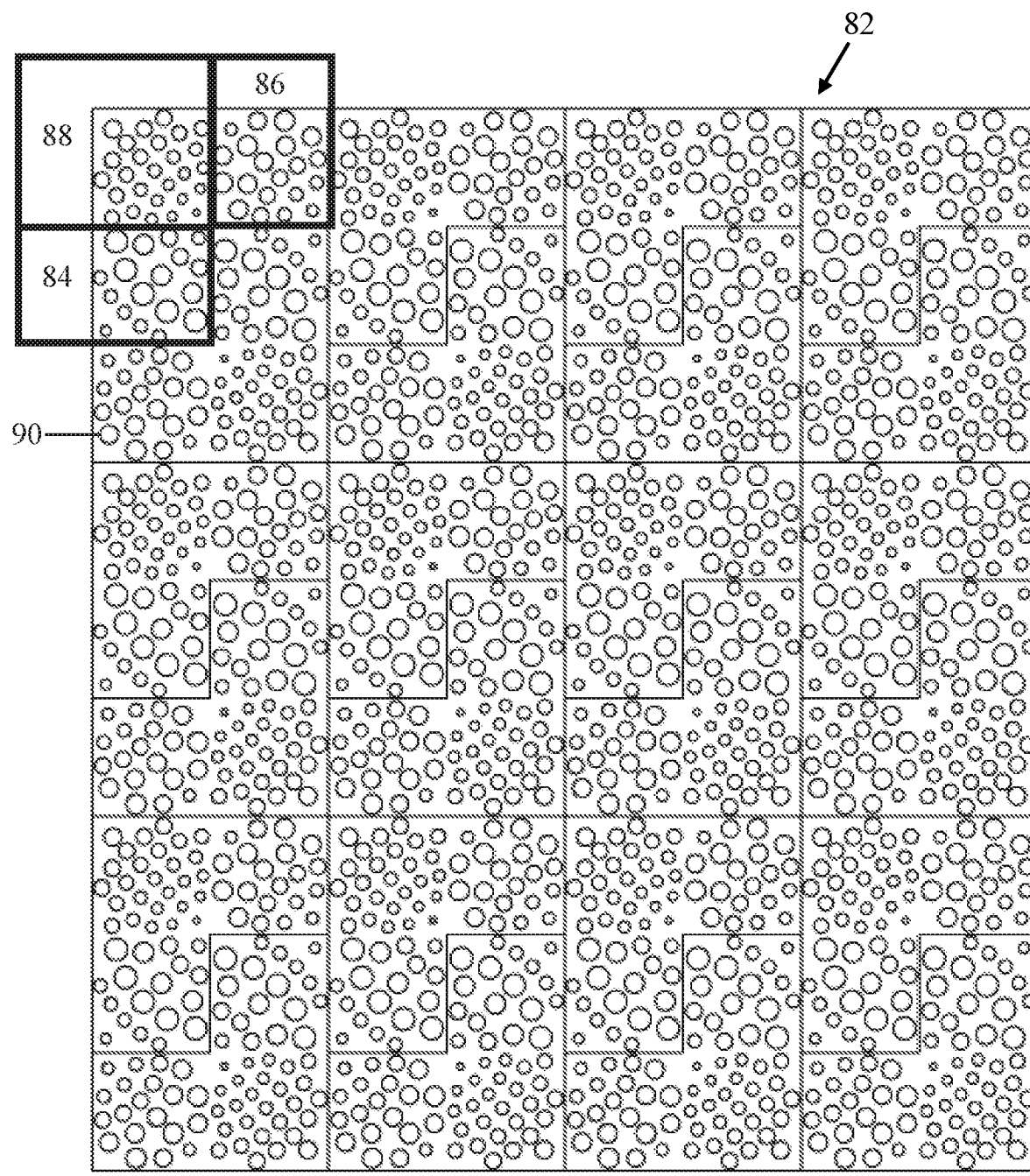
FIG. 17A: illustrates a plan view of a metasurface design in an embodiment of the present disclosure comprising a radial array of 32 sub-hogels comprising three sub-hogel arrays.

FIG. 17A illustrates a plan view of a metasurface 82 design as per an embodiment of the present disclosure, designed for a radial array of 32 monochromatic sub-hogels. The metasurface 82 shown has different colour regions for each sub-pixel colour, where colour region 84 designed for a red sub-hogel, the metasurface colour region 86 designed for a green sub-hogel, and the metasurface colour region 88 designed for a blue sub-hogel. The metasurface colour regions 84, 86, and 88, are comprised of nanopillars 90, designed using the disclosed metasurface design method as per FIG. 1.

Figure 17B:
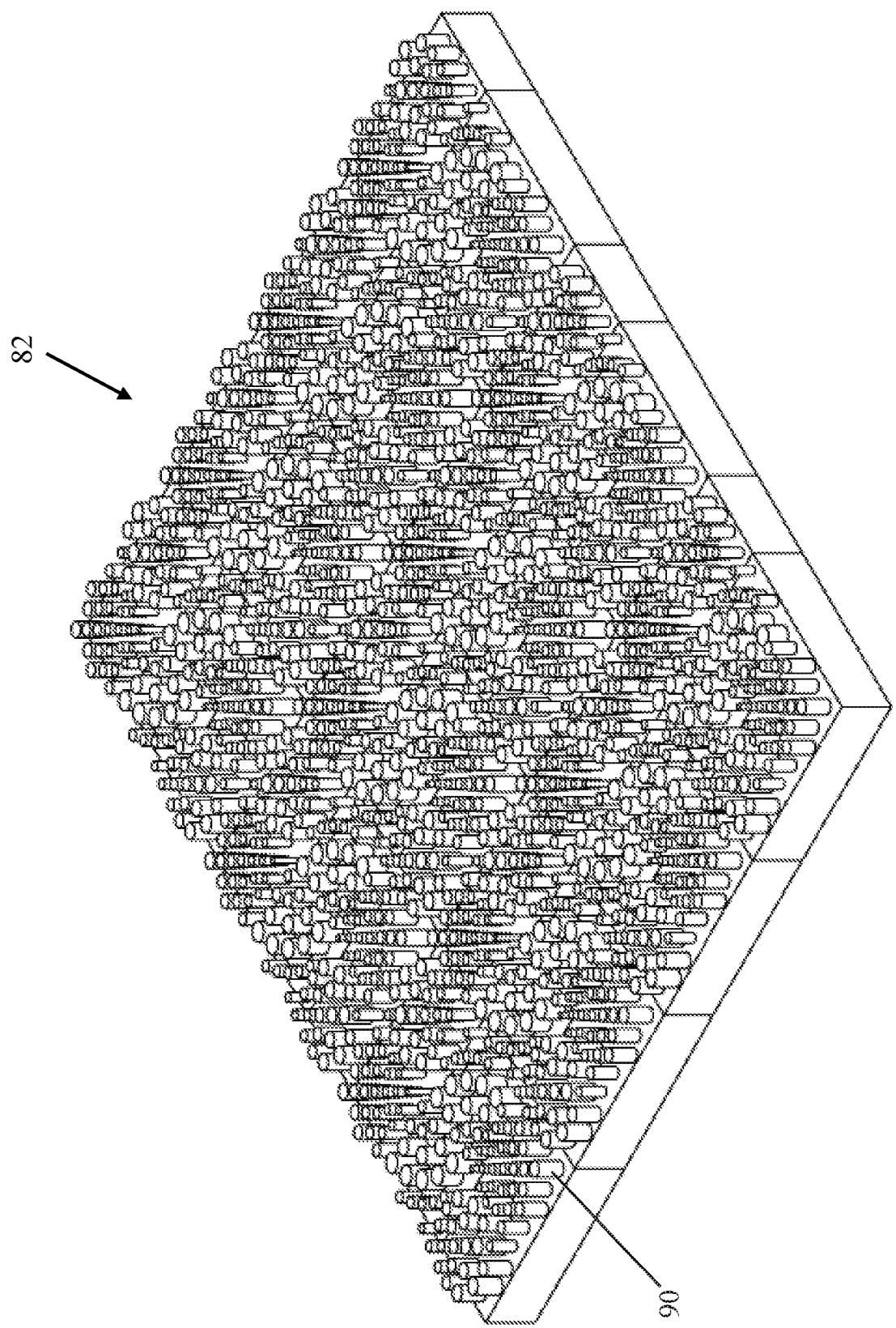
FIG. 17B illustrates an isometric view of said metasurface design as per an embodiment of the present disclosure comprising a radial array of 32 sub-hogels.

FIG. 17B illustrates an isometric view of said metasurface 82 design as per an embodiment of the present disclosure comprising a metasurface tailored for a radial array of 32 sub-hogels and further illustrating an isometric view of the nanostructures, in this case nanopillars, comprising the metasurface, designed using the disclosed metasurface design method.

All publications, patents and patent applications mentioned in this specification are indicative of the level of skill of those skilled in the art to which this invention pertains and are herein incorporated by reference. The reference to any prior art in this specification is not, and should not be taken as, an acknowledgement or any form of suggestion that such prior art forms part of the common general knowledge.

The invention being thus described, it will be obvious that the same may be varied in many ways. Such variations are not to be regarded as a departure from the scope of the invention, and all such modifications as would be obvious to one skilled in the art are intended to be included within the scope of the following claims.

We claim:
1. An optical device comprising:
a hogel array comprising a plurality of sub-hogel elemental images, each sub-hogel elemental image partitioned into a plurality of monochromatic sub-hogels each comprising a plurality of monochromatic sub-pixels, each monochromatic sub-hogel having a color-channel specific elemental image; and
a directional optical element to direct light from the sub-pixels, the directional optical element partitioned into a plurality of color regions, each color region designed to direct light of a specific color, the monochromatic sub-hogels and the plurality of color regions configured such that the plurality of monochromatic sub-pixels are aligned with the color region of the directional optical element designed to direct light of the specific color of the monochromatic sub-pixels.

2. The optical device of claim 1 wherein the directional optical element is a metasurface.

3. The optical device of claim 2 wherein the metasurface comprises nanostructures.

4. The optical device of claim 3 wherein the nanostructures comprise titanium dioxide.

5. The optical device of claim 3, wherein the nanostructures are birefringent nanostructures of a fixed size.

6. The optical device of claim 3, wherein the nanostructures are different for each color region.

7. The optical device of claim 6, wherein the nanostructures have a single height per color region.

8. The optical device of claim 6, wherein the nanostructures have a single height across all color regions.

9. The optical device of claim 2, wherein the metasurface is divided into a plurality of segments to accommodate the plurality of color regions such that each of the plurality of segments has a corresponding cluster of like colored sub-pixels.

10. The optical device of claim 9, wherein each of the plurality of segments is tailored to a specific wavelength of light.

11. The optical device of claim 10, wherein the specific wavelength of light is red light, blue light, or green light.

12. The optical device of claim 1 wherein each of the monochromatic sub-pixels is individually addressable.

13. The optical device of claim 1 wherein the plurality of monochromatic sub-hogels comprise at least one monochromatic red sub-hogel, at least one monochromatic green sub-hogel, and at least one monochromatic blue sub-hogel.

14. The optical device of claim 1 wherein each monochromatic sub-hogel comprises fewer monochromatic sub-pixels than can individually be discerned by a human eye.

15. The optical device of claim 1 wherein each monochromatic sub-hogel has between 2 and 144 monochromatic sub-pixels.

16. The optical device of claim 1 wherein each sub-pixel is less than 10 μm².

17. The optical device of claim 1 wherein the monochromatic sub-pixels in each monochromatic sub-hogel are arrayed in a square configuration, rectangular configuration, or radial configuration.

18. The optical device of claim 1 wherein the directional optical element is a geometric metasurface, Pancharatnam-Berry metasurface, an inverse design metasurface, a dispersive phase compensating metasurface, or a combination thereof.

19. The optical device of claim 1 wherein the optical device is a light field display.

* * * * *